United States Patent [19]
Ayyoubi et al.

[11] Patent Number: 5,233,514
[45] Date of Patent: Aug. 3, 1993

[54] SYSTEM AND METHOD FOR REDEEMING AND ACCUMULATING STOCK PURCHASE CREDITS IN A COMPANY BY THE PARTICIPATING CONSUMERS

[76] Inventors: Luay Ayyoubi, P.O. Box 8636, The Woodlands, Tex. 77387-8636; Rick Olcott, 713 Palomas NE., Alburquerque, N. Mex. 87108

[21] Appl. No.: 462,628

[22] Filed: Jan. 9, 1990

[51] Int. Cl.⁵ .................. G06F 15/20; G06F 15/00
[52] U.S. Cl. ................................. 364/408; 364/401
[58] Field of Search .................... 364/408, 401, 406

[56] References Cited

U.S. PATENT DOCUMENTS 4,882,675 11/1989 Nichtberger et al. ............... 364/401

Primary Examiner—Roy N. Envall, Jr
Assistant Examiner—Xuong Chung
Attorney, Agent, or Firm—William E. Shull

[57] ABSTRACT

A system and method for acquiring an equity position in a company through the purchase of qualifying products or services offered by the company, by accumulating credits toward the purchase of stock in the company based on the quantity of goods or services purchased. The invention is adapted for implementation, in part, on a digital computer. Consumers who purchase qualifying goods or services redeem UPC labels showing proof of purchase, and are given a designated credit toward the purchase of stock in the manufacturer or supplier for each label redeemed. When a participating consumer has accumulated enough credits for a particular manufacturer or supplier to purchase one or more shares of its stock, a buy order is issued for the appropriate number of shares, and the consumer's credits are reduced accordingly.

7 Claims, 29 Drawing Sheets

Computer Program Flowchart

FIG. 26

Data File Descriptions

Manufacturer/Product File
File Name: MANUFACT.DAT
File Size: 125 bytes

| Field Name | Length | Description |
|---|---|---|
| MC$ | 5 | Manufacturer's U.P.C. Code |
| MN$ | 20 | Manufacturer's Name |
| MPC1$ | 5 | Product #1 U.P.C. Code |
| MPN1$ | 15 | Product #1 Name |
| MPA1$ | 5 | Product #1 credit amount upon redemption (XX.XXX) |
| MPC2$ | 5 | Product #2 U.P.C. Code |
| MPN2$ | 15 | Product #2 Name |
| MPA2$ | 5 | Product #2 credit amount upon redemption (XX.XXX) |
| MPC3$ | 5 | Product #3 U.P.C. Code |
| MPN3$ | 15 | Product #3 Name |
| MPA3$ | 5 | Product #3 credit amount upon redemption (XX.XXX) |
| MPC4$ | 5 | Product #4 U.P.C. Code |
| MPN4$ | 15 | Product #4 Name |
| MPA4$ | 5 | Product #4 credit amount upon redemption (XX.XXX) |

Participant File
File Name: PARTICIP.DAT
File Size: 122 bytes

| Field Name | Length | Description |
|---|---|---|
| PC$ | 5 | Participant's Identification Number |
| PN$ | 20 | Participant's Name |
| PA$ | 20 | Participant's Address |
| PT$ | 15 | Participant's City |
| PS$ | 2 | Participant's State (2 character Postal Code) |
| PZ$ | 5 | Participant's Zip Code |
| PMC1$ | 5 | Manufacturer Code #1 |
| PMB1$ | 6 | Balance for Manufacturer #1 (XXX.XXX) |
| PMC2$ | 5 | Manufacturer Code #2 |
| PMB2$ | 6 | Balance for Manufacturer #2 (XXX.XXX) |
| PMC3$ | 5 | Manufacturer Code #3 |
| PMB3$ | 6 | Balance for Manufacturer #3 (XXX.XXX) |
| PMC4$ | 5 | Manufacturer Code #4 |
| PMB4$ | 6 | Balance for Manufacturer #4 (XXX.XXX) |
| PMC5$ | 5 | Manufacturer Code #5 |
| PMB5$ | 6 | Balance for Manufacturer #5 (XXX.XXX) |

U.P.C. Redemption File
File Name: UPCREDEM.DAT
File Size: 18 bytes

| Field Name | Length | Description |
|---|---|---|
| UP$ | 5 | Participant Identification Code |
| UM$ | 5 | Manufacturer's U.P.C. Code Number |
| UC$ | 5 | Product Code Number |
| UN$ | 3 | Number of U.P.C. labels redeemed |

Stock Price File
File Name: STOCKPRC.DAT
File Size: 31 bytes

| Field Name | Length | Description |
|---|---|---|
| SM$ | 5 | Manufacturer's U.P.C. Code Number |
| SN$ | 20 | Manufacturer's Name |
| SP$ | 6 | Price per share of stock (XXX.XXX) |

FIG. 27

Manufacturer/Product Report

Manufacturer's Code # : 11225  Name: Kingston

| Prod. Code | Product Name | Credit Amount |
|---|---|---|
| 62325 | Ammonia | $ 0.125 |
| 48130 | Soft Cleanser | $ 0.250 |
| 40425 | Black Pepper | $ 0.070 |
| 30760 | Baking Soda | $ 0.100 |

Manufacturer's Code # : 41573  Name: Smith's

| Prod. Code | Product Name | Credit Amount |
|---|---|---|
| 61372 | Dry Milk | $ 0.250 |
| 61278 | Quick Oats | $ 0.170 |
| 00000 |  | $ 0.000 |
| 00000 |  | $ 0.000 |

Manufacturer's Code # : 38000  Name: Kellogg's

| Prod. Code | Product Name | Credit Amount |
|---|---|---|
| 52000 | Rice Krispies | $ 0.125 |
| 55230 | Product 19 | $ 0.140 |
| 50035 | Nut 'n Honey | $ 0.130 |
| 00000 |  | $ 0.000 |

FIG. 28

Participant Report

Participant's Code: 10000
Participant's Name: George H. Shrub
Address: 1600 Penn. Ave.
City, State, Zip: Washington, DC 12345

| Manuf. Code | Manufacturer Name | Accrued Balance |
|---|---|---|
| 11225 | Kingston | $ 10.625 |
| 38000 | Kellogg's | $ 0.125 |
| 41573 | Smith's | $ 8.000 |

Participant's Code: 11000
Participant's Name: John Q. Public
Address: 1234 Main Street
City, State, Zip: Anytown, AL 34562

| Manuf. Code | Manufacturer Name | Accrued Balance |
|---|---|---|
| 11225 | Kingston | $ 27.000 |
| 38000 | Kellogg's | $ 1.375 |
| 41573 | Smith's | $ 20.500 |

Participant's Code: 12000
Participant's Name: Mary L. Johnson
Address: 4545 Memory Lane
City, State, Zip: Sandusky, OH 65228

| Manuf. Code | Manufacturer Name | Accrued Balance |
|---|---|---|
| 41573 | Smith's | $ 11.125 |

Participant's Code: 13000
Participant's Name: Mr. Sulu
Address: 1701-A Enterprise St.
City, State, Zip: Galax, WV 54545

| Manuf. Code | Manufacturer Name | Accrued Balance |
|---|---|---|
| 41573 | Smith's | $ 20.625 |
| 11225 | Kingston | $ 5.500 |
| 38000 | Kellogg's | $ 1.950 |

FIG. 29

U.P.C. Redemption Report

| Participant Code and Name | UPC Code | Manufacturer and Product |
|---|---|---|
| 10000 George H. Shrub | 38000-55230 | Kellogg's Product 19<br>5 labels at 0.140 = $0.700 |
| 10000 George H. Shrub | 11225-30760 | Kingston Baking Soda<br>2 labels at 0.100 = $0.200 |
| 13000 Mr. Sulu | 41573-61278 | Smith's Quick Oats<br>12 labels at 0.170 = $2.040 |

FIG. 30

Stock Price Report

| Manufacturer Code and Name | Stock Price |
|---|---|
| 11225 Kingston | $13.125 |
| 41573 Smith's | $20.500 |
| 38000 Kellogg's | $45.500 |

FIG. 31

Buy Stock Order

Participant's Code:   11000
Participant's Name:   John Q. Public
Address:   1234 Main Street
City, State, Zip:   Anytown, AL 34562

| Manuf. Code | Manufacturer Name | Number of Shares |
|---|---|---|
| 11225 | Kingston | 2 |
| 41573 | Smith's | 1 |

FIG. 32

Buy Stock Order

Participant's Code:   13000
Participant's Name:   Mr. Sulu
Address:   1701-A Enterprise St.
City, State, Zip:   Galax, WV 54545

| Manuf. Code | Manufacturer Name | Number of Shares |
|---|---|---|
| 41573 | Smith's | 1 |

SYSTEM AND METHOD FOR REDEEMING AND ACCUMULATING STOCK PURCHASE CREDITS IN A COMPANY BY THE PARTICIPATING CONSUMERS

BACKGROUND OF THE INVENTION

The present invention relates to a system and method for acquiring an equity position in a company through the purchase of qualifying products or services offered by the company, by accumulating credits toward the purchase of stock in the company based on the quantity of goods or services purchased.

The system and method of the present invention is unique in that it ultimately benefits everyone involved—the consumer, the manufacturer, the retailer, those in the stock market, and the participants and their children, who comprise the next generation of all of the forgoing. Participation for the purchasers encompasses virtually no more time, effort, or expense than cutting out a coupon. As participation in the program increases, more people are drawn into the stock market, generating new activity and bringing more resources into the market. From all economic indicators, the more activities that are performed in the stock market, and the more resources that are made available in and through the market, the tendency exists to generate a market boom. The stock market is and always has been the economic barometer regarding the prosperity, recession, or depression of the nation's economy. Consequently, the system and method of the present invention will contribute to the activities of the market, which in turn affects virtually everyone in this country and enhances the positive attributes of an over-all healthy national economy.

The system and method of the present invention affords people a shot at the "American Dream." Living the American Dream appeals to all Americans and evokes bettering oneself, possessing "a piece of the Rock" (which can translate into owning shares of stock), and feeling secure and optimistic about the future. Traditionally, there has been a reluctance on the part of many people to delve into the world of stock ownership. Some may think that matters relating to stock ownership are too complex, or that stocks are too risky or expensive for them to feel comfortable with stock purchases. Many people harbor other misconceptions of stock purchase and ownership. As a result, many people who would benefit from stock ownership never buy stocks. The system and method of the present invention would mitigate, if not eliminate altogether, this reluctance. Stock ownership will simply be an added benefit from participants' purchases of qualifying goods or services. It is contemplated that the qualifying goods or services would probably be purchased in any event, and might easily have been purchased from the designated manufacturers even without the added benefit of accumulating stock purchase credits. The accumulation of stock purchase credits would go on with only a modicum of effort by the participants; thus, they would be acquiring "a piece of the Rock" and helping to fulfill the American Dream virtually automatically as they go about their daily routines. Moreover, the system and method of the present invention may also serve to increase jobs. For instance, as sales increased from the consumer's purchase of specific participating products, the manufacturing facilities and personnel for that product line would increase at some point as well, as soon as excess capacity is fully utilized. Thus, not only would a participating individual enhance his own financial well-being and help to secure his future and that of his or her children, but the present invention also affords an opportunity for others, i.e., the people who produce the goods and services and those who depend upon them, to feel a direct sense of participation in the invention and to benefit from the enhanced economy that follows along with its growth.

Another significant aspect of the present invention is its potentially great beneficial impact on the education of our youth. With the skyrocketing costs of higher education, many families today cannot afford to send their children to college. Many of those families comprise students who are otherwise deserving of a college education. Since a loan or similar financial aid is not always available, and not all students can qualify for scholarships, many deserving students are thus prevented from obtaining a college degree. If the parents of such students are participants in the system and method of the present invention, however, and are thus stockholders, they can sell the shares of stock they have accumulated over the years when funds are needed for college. As a result, there will be more opportunities for such students to enter college. As educational opportunities are improved and enhanced, the more productive a society becomes. The system and method of the present invention thus affords a new dimension of choices regarding one's future.

Likewise, for some students in the inner city, for example, whose future might seem bleak with minimal opportunities to "break the cycle of poverty," the present invention would afford individuals with a motivation and a simple means to acquire some of the funds needed for higher education. Thus, participating individuals and their families are afforded the opportunity to upgrade their economic situation and open doors that might not otherwise be opened to them. Sociologists and educators have long noted that when hope exists, there is less demand for immediate gratification (which might entail drugs, crime, etc,). Instead, there is a greater feeling of self-worth and self-esteem.

In sum, the present invention will be available to all Americans to share in the American Dream and not only better themselves and their families, but our nation and society as a whole, and in turn, the world in which we live.

SUMMARY OF THE INVENTION

The present invention comprises a system and method for acquiring stock or a similar equity interest in a company through the purchase of qualifying products or services offered by the company, by accumulating credits toward the purchase of stock in the company based on the quantity of goods or services purchased. The present invention is adapted for implementation, in part, on a digital computer.

When a consumer purchases a product or service from a participating manufacturer, he or she cuts or otherwise removes a UPC label from the product or its packaging, or from a receipt or other indicia of purchase. The consumer then sends the UPC label to a processing center, where the computer and other facilities and equipment for further implementing the invention are maintained. A computer file is kept at the processing center for that particular consumer, and other files are kept for participating manufacturers and their products. The UPC label is authenticated, verifying that the label is genuine and not a forgery. Authenticated labels are scanned for content, and the particulars for that product are added to the consumer's file, in a sub-file under the appropriate manufacturer. Each UPC label read adds to the consumer's file a credit, measured in dollars or points or some other appropriate units.

At the same time, the system maintains files of current stock prices for participating manufacturers, again in dollars, points or other appropriate units. When a consumer has accumulated enough credits in a manufacturer's sub-file to equal or exceed the current stock price for that manufacturer, the system issues a buy order to purchase a share or shares, as the case may be, of that manufacturer's stock.

The consumer is responsible for maintaining his own stock portfolio when the stock is provided to him.

The foregoing objects and advantages of the present invention will be apparent from the following description of the preferred embodiment when read in conjunction with reference to the accompanying drawings, wherein:

BRIEF DESCRIPTION OF THE DRAWINGS

FIG. 2 is a flowchart illustrating the Main Menu of the system of the invention;

FIG. 3 is a flowchart illustrating the Initialize Files feature of the system of the invention;

FIG. 4 is a flowchart illustrating the Manufacturer/Product Maintenance features of the system of the invention;

FIG. 5 is a flowchart illustrating the Add Manufacturer/Product function comprised in the Manufacturer/Product Maintenance features of the system of the invention;

FIG. 6 is a flowchart illustrating the Update Manufacturer/Product function comprised in the Manufacturer/Product Maintenance features of the system of the invention;

FIG. 7 is a flowchart illustrating the Delete Manufacturer/Product function comprised in the Manufacturer/Product Maintenance features of the system of the invention;

FIG. 8 is a flowchart illustrating the Print Manufacturer/Product Report function comprised in the Manufacturer/Product Maintenance features of the system of the invention;

FIG. 9 is a flowchart illustrating the Participant Maintenance features of the system of the invention;

FIG. 10 is a flowchart illustrating the Add Participant function comprised in the Participant Maintenance features of the system of the invention;

FIG. 11 is a flowchart illustrating the Update Participant function comprised in the Participant Maintenance features of the system of the invention;

FIG. 12 is a flowchart illustrating the Delete Participant function comprised in the Participant Maintenance features of the system of the invention;

FIG. 13 is a flowchart illustrating the Print Participant Report function comprised in the Participant Maintenance features of the system of the invention;

FIG. 14 is a flowchart illustrating the UPC Redemption features of the system of the invention;

FIG. 15 is a flowchart illustrating the Add UPC Redemption function comprised in the UPC Redemption features of the system of the invention;

FIG. 16 is a flowchart illustrating the Update UPC Redemption function comprised in the UPC Redemption features of the system of the invention;

FIG. 17 is a flowchart illustrating the Delete UPC Redemption function comprised in the UPC Redemption features of the system of the invention;

FIG. 18 is a flowchart illustrating the Print UPC Redemption Report function comprised in the UPC Redemption features of the system of the invention;

FIG. 19 is a flowchart illustrating the Post UPC Redemptions function comprised in the UPC Redemption features of the system of the invention;

FIG. 20 is a flowchart illustrating the Stock Price Entry features of the system of the invention;

FIG. 21 is a flowchart illustrating the initialize Stock Price File function comprised in the Stock Price Entry features of the system of the invention;

FIG. 22 is a flowchart illustrating the Enter Stock Price and Modify Stock Price functions comprised in the Stock Price Entry features of the system of the invention;

FIG. 23 is a flowchart illustrating the Print Stock Price Report function comprised in the Stock Price Entry features of the system of the invention;

FIG. 24 is a flowchart illustrating the Stock Purchase features of the system of the invention;

FIG. 26 is a listing of the data file descriptions of the system of the present invention;

FIG. 27 shows a representative manufacturer/product report for the system of the present invention;

FIG. 28 shows a representative participant report for the system of the present invention;

FIG. 29 shows a representative UPC redemption report for the system of the present invention;

FIG. 30 shows a representative stock price report for the system of the present invention;

FIGS. 31 and 32 show representative buy stock orders for the system of the present invention;

FIG. 31 illustrates a buy stock order for fictitious participant John Q. Public;

FIG. 32 illustrates a buy stock order for fictitious participant Mr. Sulu.

DESCRIPTION OF THE PREFERRED EMBODIMENT OF THE INVENTION

Figure 1:
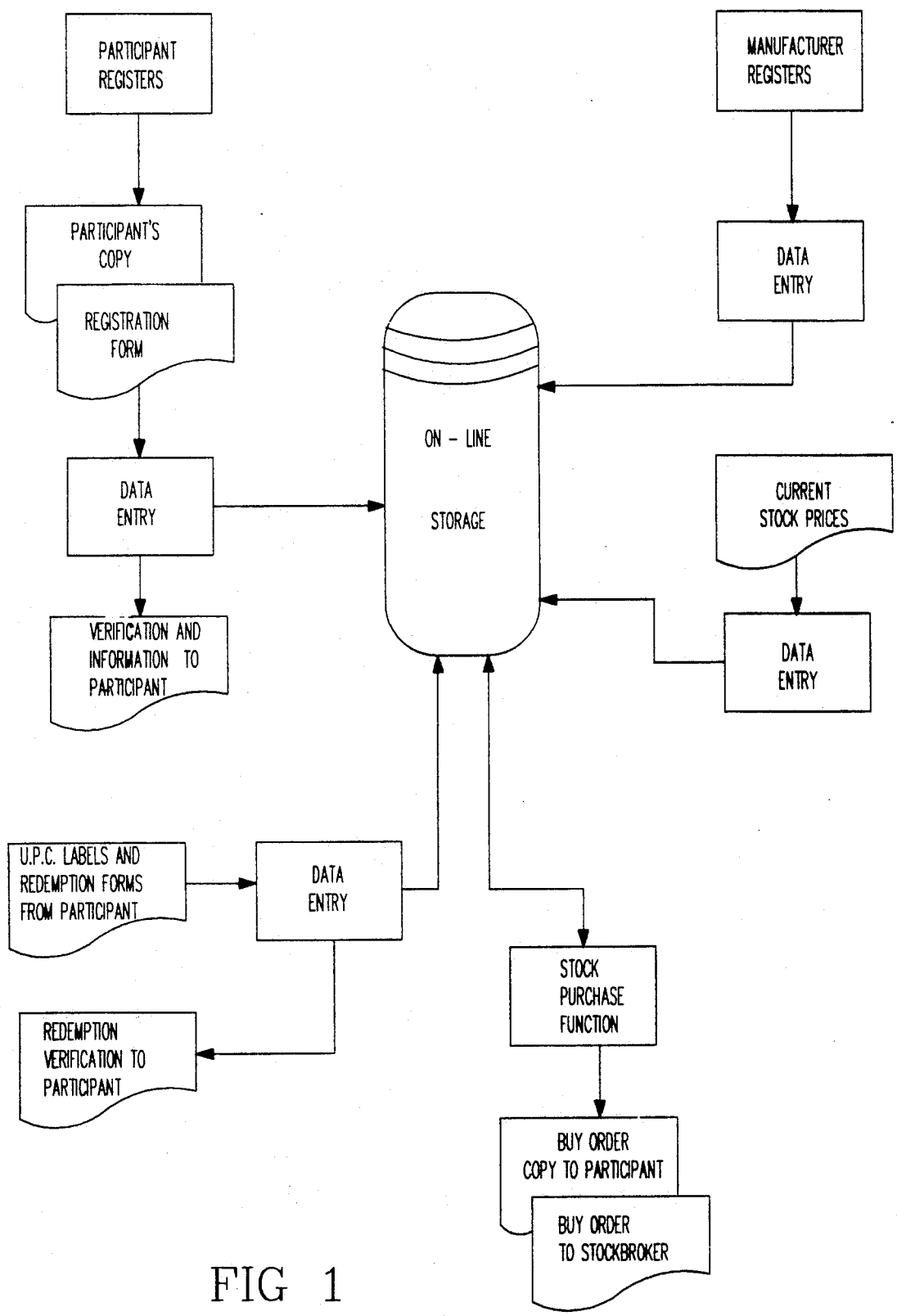
FIG. 1 is a chart showing the relationships of the overall system functions of the present invention.

The present description of the invention will be in regard to a simplified working model of it which was developed to demonstrate its features and functions without attempting full-scale implementation. The working model was designed to be easily demonstratable and portable, and was thus placed on a single diskette. The space limitations on a single diskette result in limitations as to the number of manufacturers and participants that can be entered with the working model. When the system reaches the actual implementation stage, the file system will be converted to a relational database application that will allow for virtually unlimited numbers of manufacturers and participants. The model system does not track information further than the issuance of stock purchase orders. The actual implementation will maintain the data for a much longer period of time, allowing for the access to and reporting of historical information by manufacturer, product, and participant.

In keeping the working model self-contained, it was necessary to have all data entered from the computer keyboard. In the actual implementation, a light pen or other UPC label reading device will be used during the UPC redemption functions. Participants may submit punch cards, machine-readable "fill-in" cards, or other computer-implemented means for allowing the system to identify the person submitting the UPC labels. This will not only greatly speed up data entry, but will also virtually eliminate data entry errors. Similarly, the user of the working model is required to enter stock prices from the computer keyboard. In the actual implementation, there will be a direct link, via modem, to an on-line stock price quotation service. This will allow for up-to-the-minute stock prices to be used in the stock purchase function. In the actual implementation, buy orders can be transmitted electronically to the stock broker to avoid any delays and to take full advantage (or disadvantage) of the fluctuations in stock prices.

INSTALLATION GUIDE

The system and method of the present invention was developed for IBM and IBM-compatible microcomputers. The minimum system configuration is:

IBM or 100% IBM compatible microcomputer with 640KB of RAM;
Monochrome monitor;
One 360KB floppy diskette drive;
80 column parallel printer.

IBM is a registered trademark of International Business Machines Corp.

The computer program for the system and method for the present invention is contained on the diskette. To implement the program, the diskette is placed in the default diskette drive (usually drive A:), and the computer is turned on. After a few moments, the operator is asked to enter the date and time. Once these are entered, the Main Menu will appear on the screen. Alternatively, if the computer is already turned on, the diskette is placed in the A: diskette drive. A letter "A" is typed in, and the Enter key is pressed. Then the word "Autoexec" is typed in, and the Enter key is pressed again. The Main Menu will then appear on the screen.

FUNCTIONS AND FEATURES

The computer program for the present system and method is entirely menu-driven; that is, all options available to the user are shown on menus. To choose a selection on the menu, the operator types in the number of the desired selection and presses the Enter key. The Main Menu is the starting and ending place for all functions. Most of the functions are self-explanatory. The following description is provided to give an overview of the flow of functions within the system.

In a start-up situation, the first step in implementation of the computer program of the present invention is the initialization of the data files (Item #1 on the Main Menu). This function creates a new, blank set of data files for the system. The model system developed and described herein already contains a small data set. The next step, again in a start-up mode, would be to add information about participating manufacturers (Item #2 of the Main Menu). The next step would then be to add information about the participants in the system and method of the present invention (Item #3 on the Main Menu). After the program has been fully implemented, information about manufacturers and participants can be added on an as-needed basis. As the participants redeem UPC labels, the next step (Item #4 on the Main Menu) would be to add the UPC redemption information. Following that, the next step is to enter the current prices of the stock of all the participating manufacturers (Item #5 on the Main Menu). As mentioned above, the stock information can be obtained automatically from an on-line stock price quotation service after the program has been fully implemented. This will provide the program with up-to-the-minute prices to be used for comparison with the participants' credit balances for determining issuance of Buy Orders. Finally, the participants' balances are compared against the current stock prices and Buy Orders are issued as appropriate (Item #6 on the Main Menu). Instructions for each of the foregoing steps follow.

1. Initialize Files

With the Main Menu appearing on the screen, if the user wishes to initialize the files, the number "1" is entered, and a brief message will appear on the screen explaining the function of this segment of the program. If the user is certain that he wishes to initialize the files, and thereby erase any existing information, the letter "Y" is pressed in answer to the question, and the Enter key is pressed. Initializing will then proceed automatically. When initialization is finished, the program will return to the Main Menu. As shown in FIG. 3, the initialization function initializes the manufacturer file, the participant file, the redemption file, and the stock price file. The screen will then display a message that initialization is complete, and the program is ready to accept keyboard input. Once initialization is completed, the program returns to location "G" shown in FIG. 2.

2. Manufacturer/Product Maintenance Functions

From the Main Menu, an entry of "2" will cause the program to enter the Manufacturer/Product Maintenance functions, shown in flow chart form in FIGS. 4-8. Once entry into the Manufacturer/Product Maintenance branches is accomplished from the Main Menu, subsequent numerical entries will result in entering the Add Manufacturer branch (if entry is "1"); the Update Manufacturer branch (if entry is "2"); the Delete Manufacturer branch (if entry is "3"); or the Print Manufacturer Report branch (if entry is "4"). Entry of a "5" will send the program back to location "G" in the Main Menu shown in FIG. 2.

a. Add Manufacturer/Product

The Add Manufacturer/Product feature will enable the user to place information for a new manufacturer and/or a new product(s) on file. The user will be asked to enter the following information:
1. Manufacturer's code number: the 5 digit UPC code number for the manufacturer. This is the first 5 numbers of the 10 digit UPC number.
2. Name: the name of the manufacturer is entered, up to 20 characters.
3. Product information: information on product #1 is entered first. The 5 digit UPC code number for the first product (this is the last 5 numbers of the 10 digit UPC code) is entered, followed by the name of the product and the amount of credit that the manufacturer has decided to allow the participants upon redemption of the UPC label. The credit amount is preferably entered in dollars and cents (to 1/10 of a cent) without commas or decimal points. The computer will add the decimal point. For example, if a manufacturer chooses to allow 12½¢ credit for a particular product, the user types in "125" and presses Enter. For 25¢, the user types in "250" and presses Enter. Similar procedures are followed for subsequent products. In the working prototype of the system described herein, there is room for four products to be identified. If there are fewer than four products for a particular manufacturer, the user simply enters zeroes for the product code and presses Enter for the other two entries (product name and amount of credit).

Figure 4:
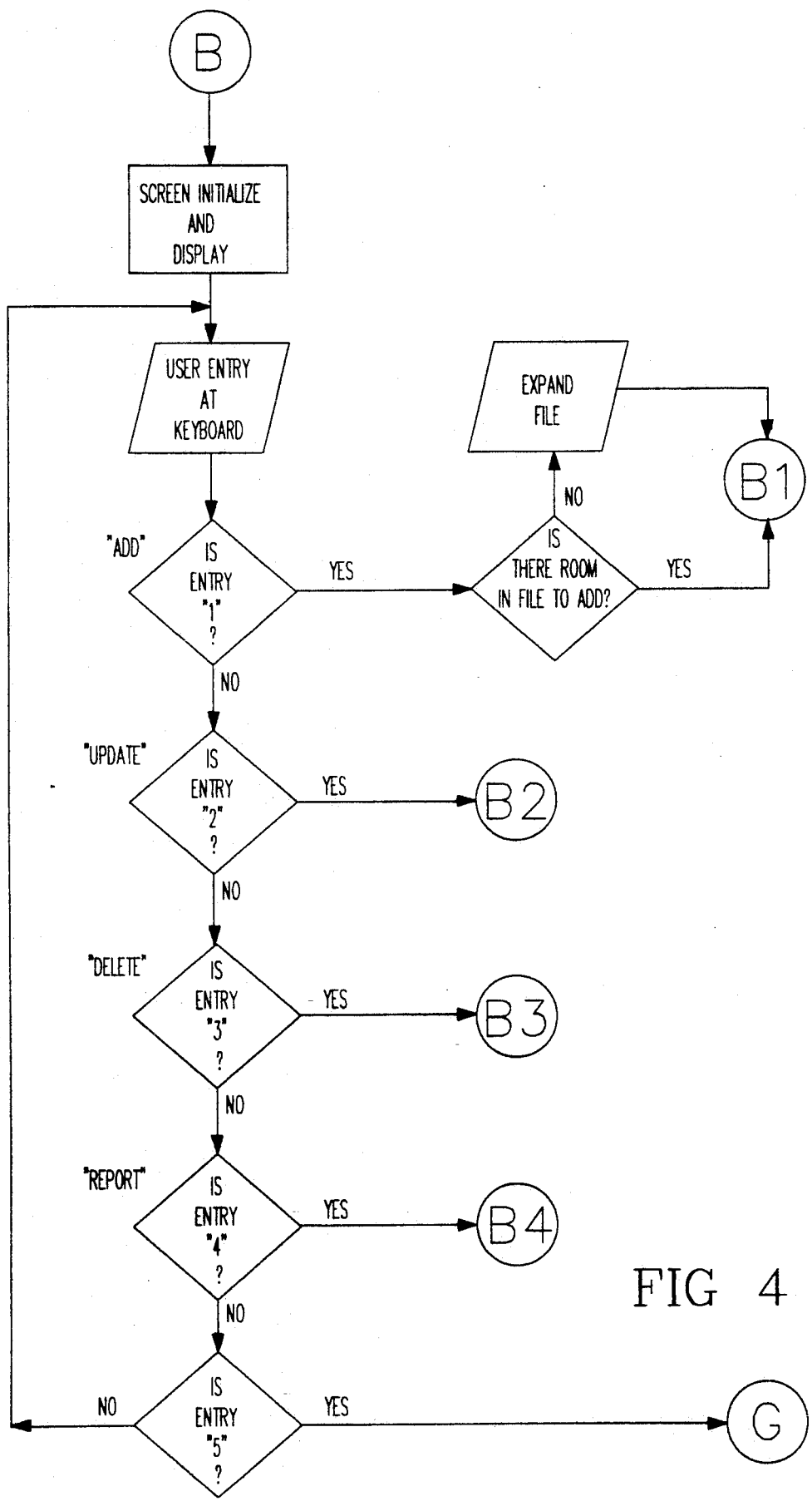
Figure 5:
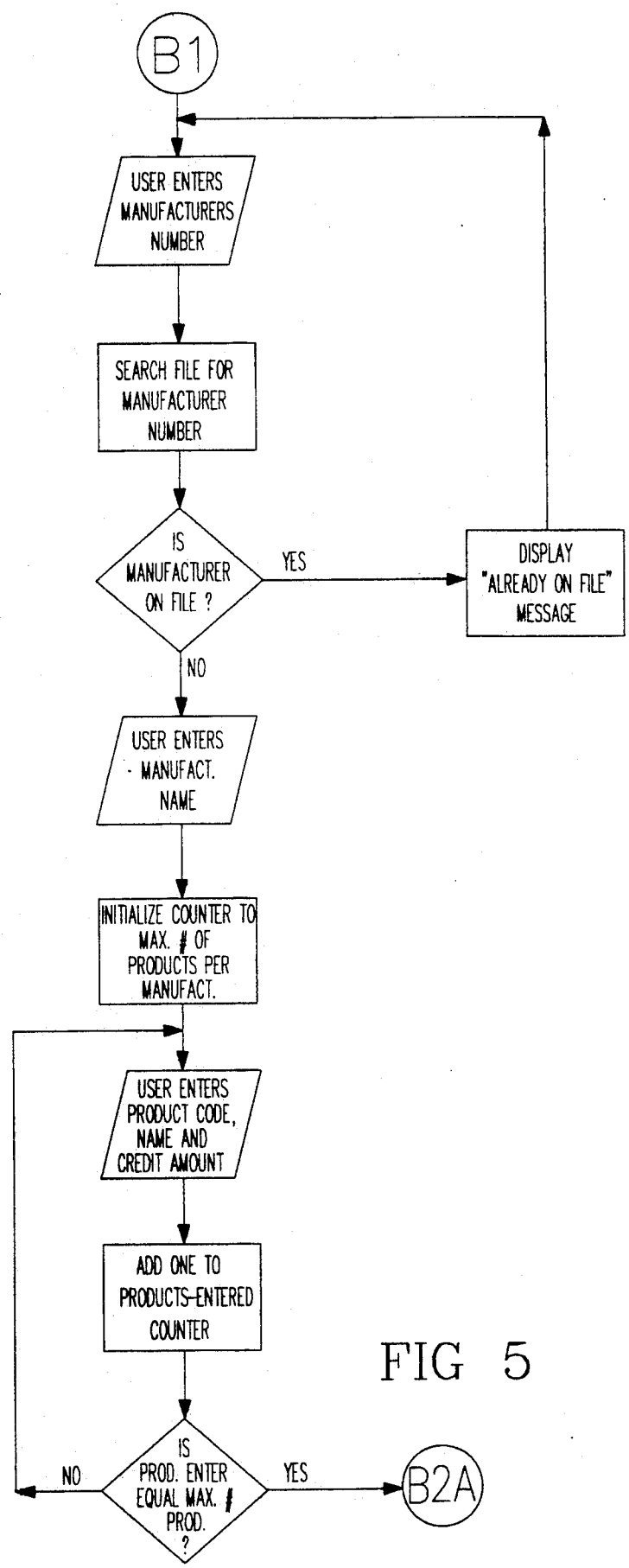
Figure 6:
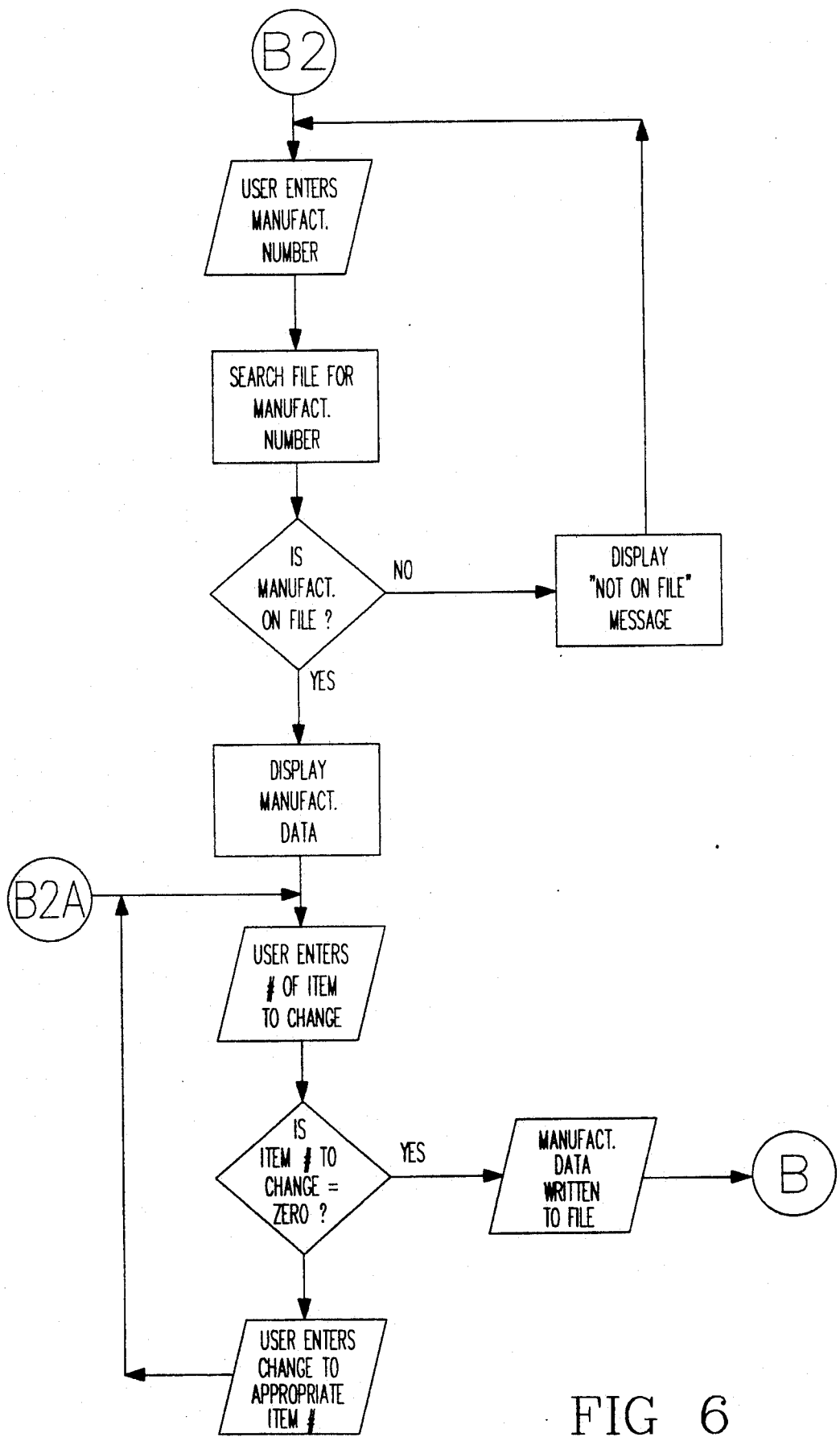
Figure 7:
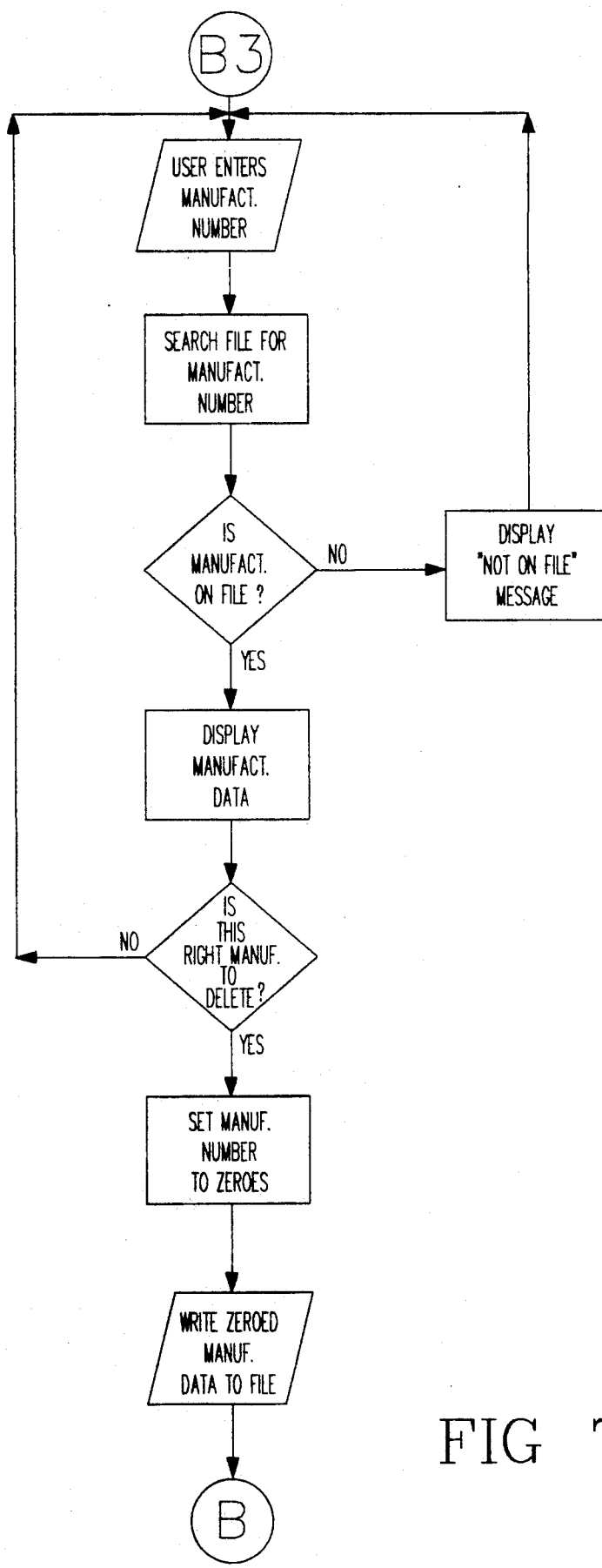

As shown in FIGS. 4 and 5, when it has been determined that there is room in the manufacturer/product file to add records, and it has also been determined that the manufacturer is not already on the system (see upper portion of FIG. 5), the user enters the new manufacturer information referred to above and can set a counter to the maximum number of products allowed for that manufacturer. Entry of the particular product information then proceeds. When the maximum number of products has been added, the system proceeds to location "B2A" shown in FIG. 6. If the user then enters a zero, the added manufacturer and product data is written to the file, and the system returns to location "B" shown in FIG. 4.

b. Update Manufacturer/Product

This function is designed to allow the user to make any changes to the Manufacturer/Product information. Entry of a "2" from the configuration shown in FIG. 4 sends the program to the Update Manufacturer function shown in flow chart form in FIG. 6. Once a user has selected this function, he will be asked to enter the manufacturer's code number. The desired number is entered. If that manufacturer is on file, all the relevant information will be displayed on the screen. A user will then be given the opportunity to make any desired changes to the information. The number corresponding to the information that needs changing is then entered. For information concerning the specific entries that may be changed, refer to the Add Manufacturer/Product description above. Once the user has made all the desired changes, he enters zero and presses Enter. The program will then return to location "B" shown in FIG. 4.

c. Delete Manufacturer/Product

This function is designed to allow the user to remove a manufacturer from the data files. The function is entered by pressing "3" from the location shown in FIG. 4. Once the user has selected this function, he will be asked to enter the manufacturer's code number. The user then enters the number of the manufacturer that he wishes to delete, and presses Enter. If the manufacturer is on file, the information pertaining to the manufacturer will be displayed on the screen. The user will then be asked if this is the correct manufacturer to delete. The user then enters "Y" or "N", for yes or no, as the case may be. If the user has entered yes, the manufacturer and all of its pertinent information will be deleted. The Delete Manufacturer function is shown in flow chart form in FIG. 7. Once the manufacturer has been deleted, the program returns to location "B" shown in FIG. 4.

d. Print Manufacturer/Product Report

Figure 8:
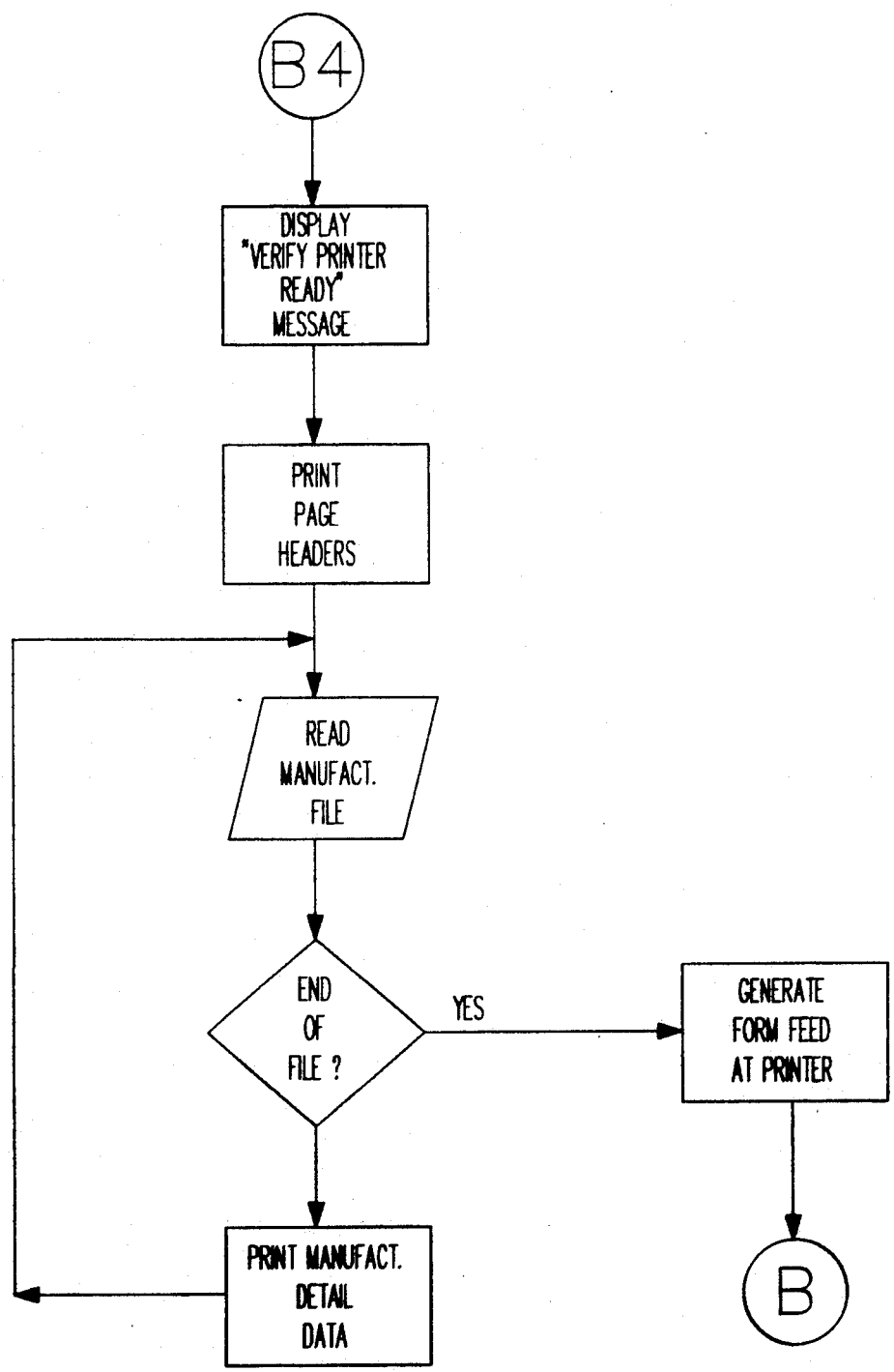

This function is entered by pressing "4" from the location shown in FIG. 4. A flow chart of it is shown in FIG. 8. It is designed to produce a hard copy report of the information pertaining to all the manufacturers on file. A user will be asked to verify that the printer is turned on and on line. Once the printer is ready, the user presses any key and the report will be printed. Once printing is complete, the program returns to location "B" shown in FIG. 4. At this point, entry of "5" will cause the program to return to location "G" shown in FIG. 2.

3. Participant Maintenance Functions

Figure 2:
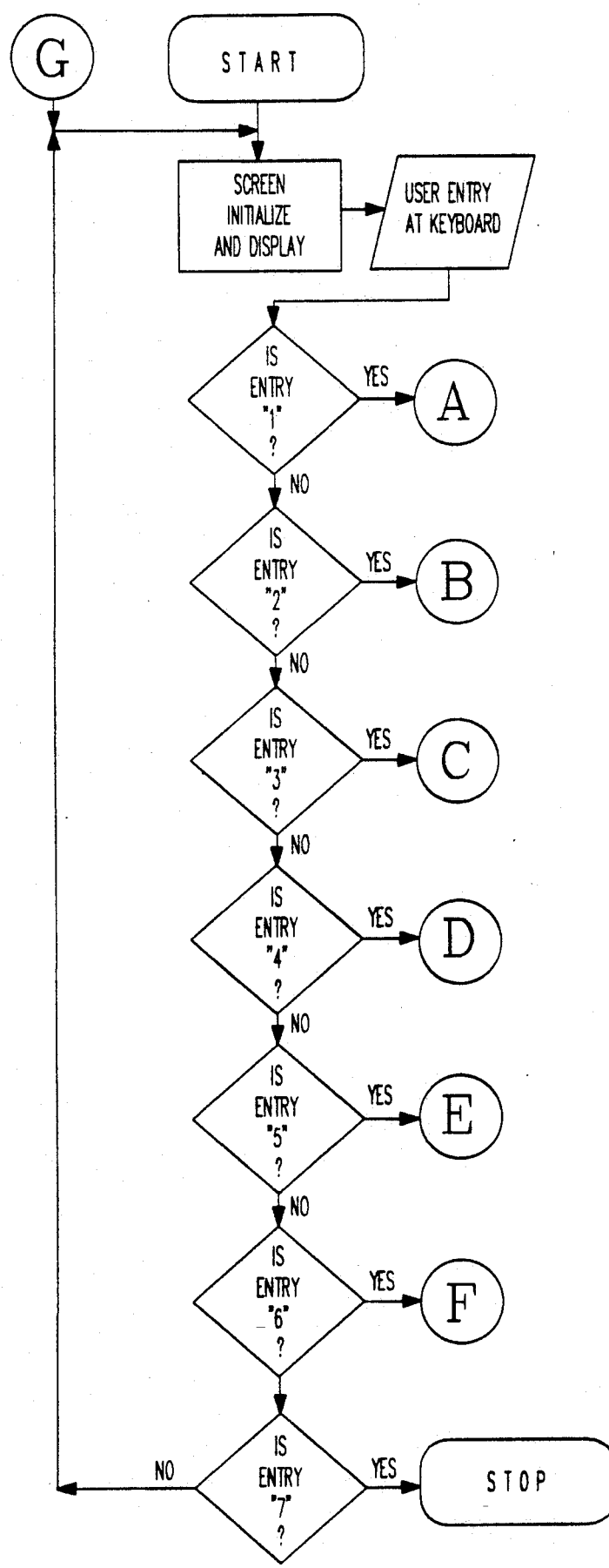
FIGS. 2-24 are flowcharts illustrating the structure and function of the various components, programs, and routines of the system of the present invention.
Figure 3:
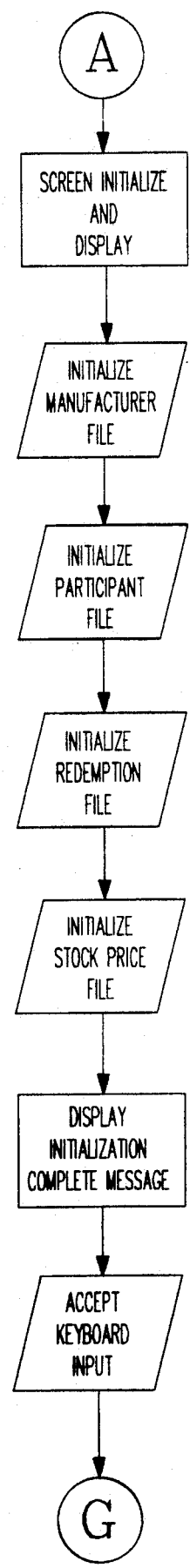

Selection of a "3" from the Main Menu of FIG. 2 sends the program to the Participant Maintenance functions illustrated in FIGS. 9–13. Once that selection has been made, further numerical entries will branch the program to the Add Participant feature (enter "1"); the Update Participant feature (enter "2"); the Delete Participant feature (enter "3"); or the Print Participant Report (enter "4"). Entry of a "5" will send the program back to location "G" of the Main Menu of FIG. 2.

a. Add Participant

This function enables the user to place information for a new participant on file. This function is reached by entering the numeral "1" from the location "C" shown in FIG. 9. Once it has been determined that there is enough room to add a participant, the features of this function operate as shown in FIG. 10 to add the pertinent information for the new participant. Referring to FIG. 10, the user first enters the participant code number. This is a five digit identification code number for that participant. Of course, in the actual implementation of the present invention, more digits can be used to identify the participant, manufacturer, products, etc. to accommodate virtually any number of the foregoing. For the purpose of the working prototype, however, the five digit identification code number for each participant is used. Once the user has entered the participant number, the program searches the file for that participant number, and indicates whether that participant number is already on file. If it is, a message is displayed on the screen indicating that that participant number is already on file. If the participant number is not already on file, the user then enters the participant's name, up to twenty characters; his or her address, up to twenty characters; his or her city of residence, up to fifteen characters; his or her state of residence, typically a two character postal abbreviation for the participant's state; and his or her five digit zip code. Further, several items of information which are normally updated automatically during the UPC Redemption functions (entered through number "4" from the Main Menu) can be changed, for convenience, in this section of the program. These items are manufacturer's code, the five digit UPC code for the manufacturer for which the participant has redeemed labels; the manufacturer's name, which is automatically displayed by the system; and the balance, which is the accrued credit balance that the participant has accumulated for this particular manufacturer. Entry of the credit balance is done in the same way as described above, up to 1/10 of one cent. Decimal points or commas are not entered. For example, to enter $60.25, the user types "60250" and presses Enter. In this part of the program, if there are fewer than five manufacturers to add, the user just enters zeroes for the subsequent manufacturers' codes. Once all of the manufacturers' code, name, and balance information which the user wishes to add here has been added, the program branches to location "C2A" shown in the Update Participant feature of FIG. 11. If there are no more items to change, the participant data is written to the file, and the program branches back to location "C" shown in FIG. 9.

b. Update Participant

This function is designed to allow the user to make any changes to the Participant information. Entry of a "2" from the configuration shown in FIG. 9 sends the program to the Update Participant function shown in flow chart form in FIG. 11. Once a user has selected this function, he will be asked to enter the Participant's Identification Number. The desired number is entered. If that Participant is on file, all the relevant information will be displayed on the screen. A user will then be given the opportunity to make any desired changes to the information. The number corresponding to the information that needs changing is then entered. For information concerning the specific entries that may be changed, refer to the Add Participant description above. Once the user has made all the desired changes, he enters zero and presses Enter. The program will then return to location "C" shown in FIG. 9.

c. Delete Participant

This function is designed to allow the user to remove a participant from the data files. The function is entered by pressing "3" from the location shown in FIG. 9. Once the user has selected this function, he will be asked to enter the Participant's Identification Number. The user then enters the number of the participant that he wishes to delete, and presses Enter. If the participant is on file, the information pertaining to the participant will be displayed on the screen. The user will then be asked if this is the correct participant to delete. The user then enters "Y" or "N", for yes or no, as the case may be. If the user has entered yes, the participant and all of his pertinent information will be deleted. The Delete Participant function is shown in flow chart form in FIG. 12. Once the participant has been deleted, the program returns to location "C" shown in FIG. 9.

d. Print Participant Report

Figure 9:
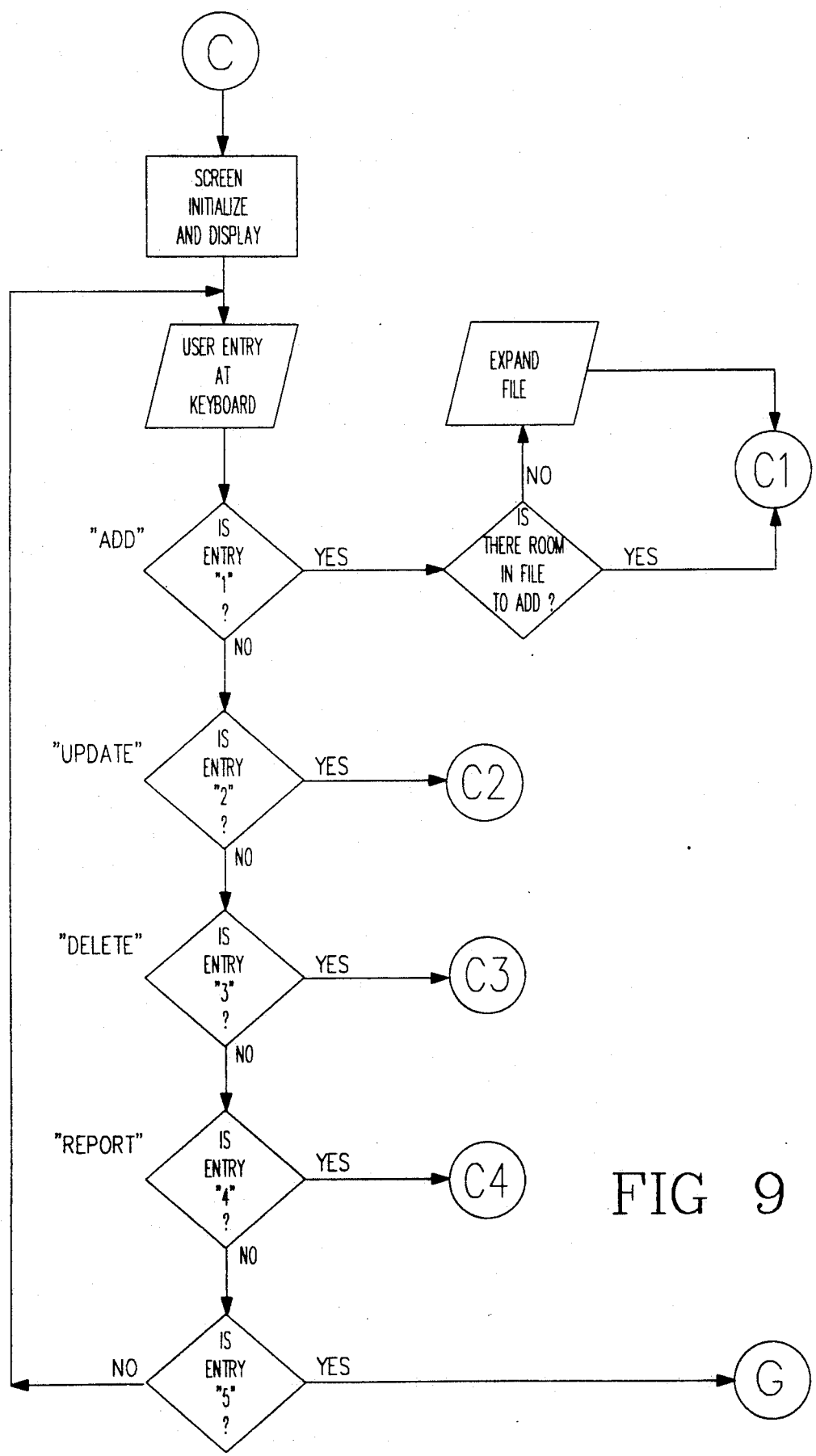
Figure 10:
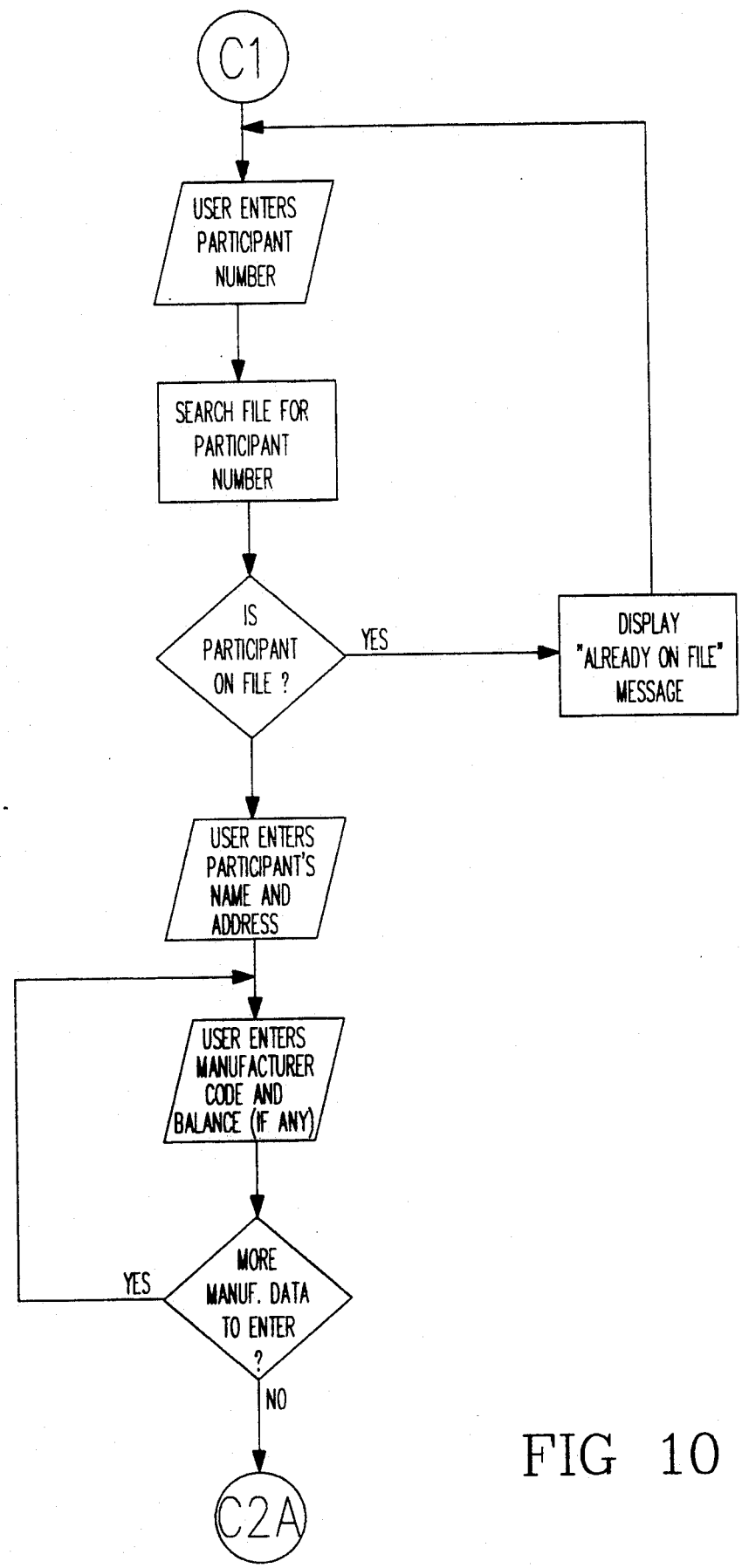
Figure 11:
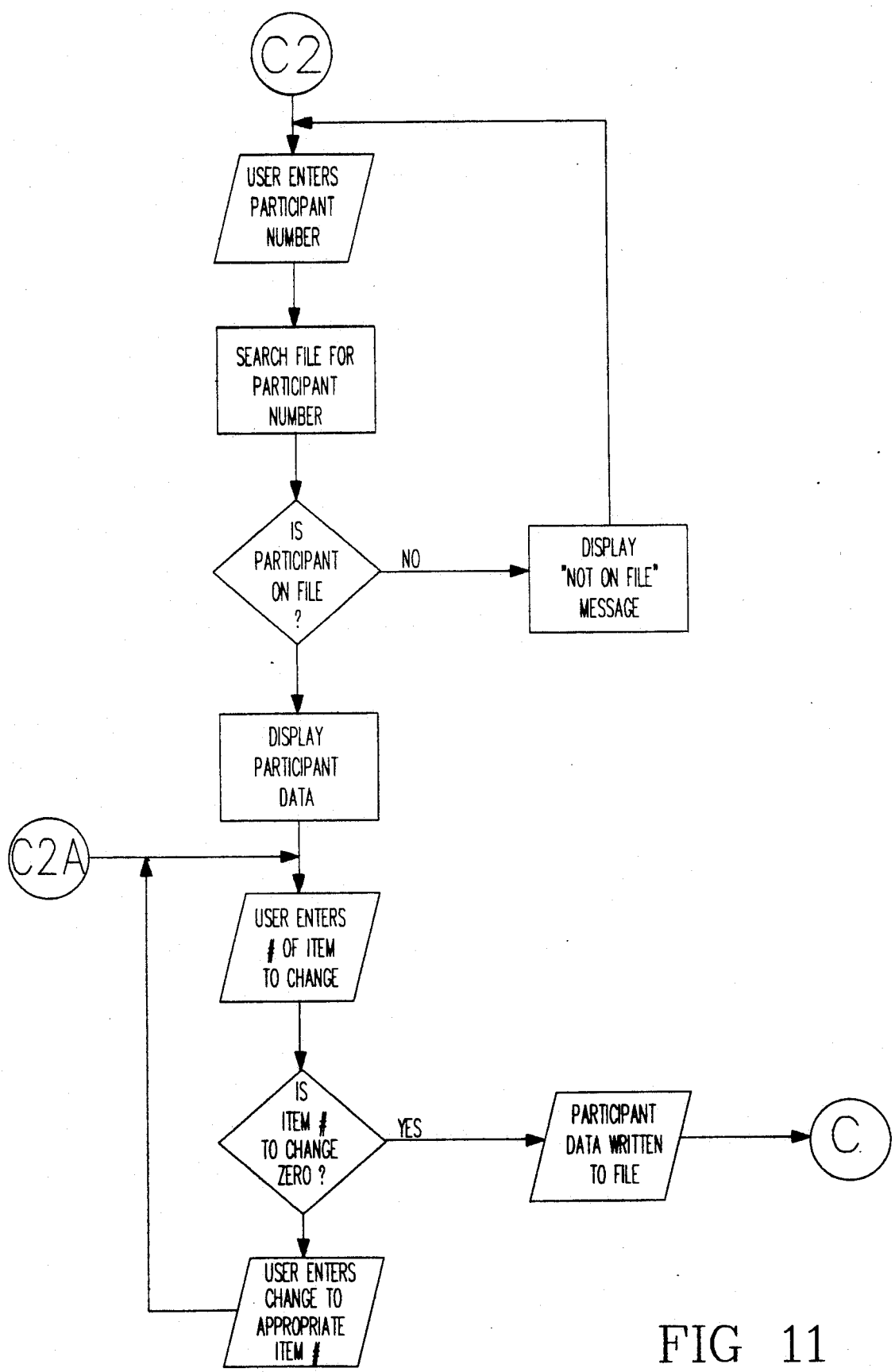
Figure 12:
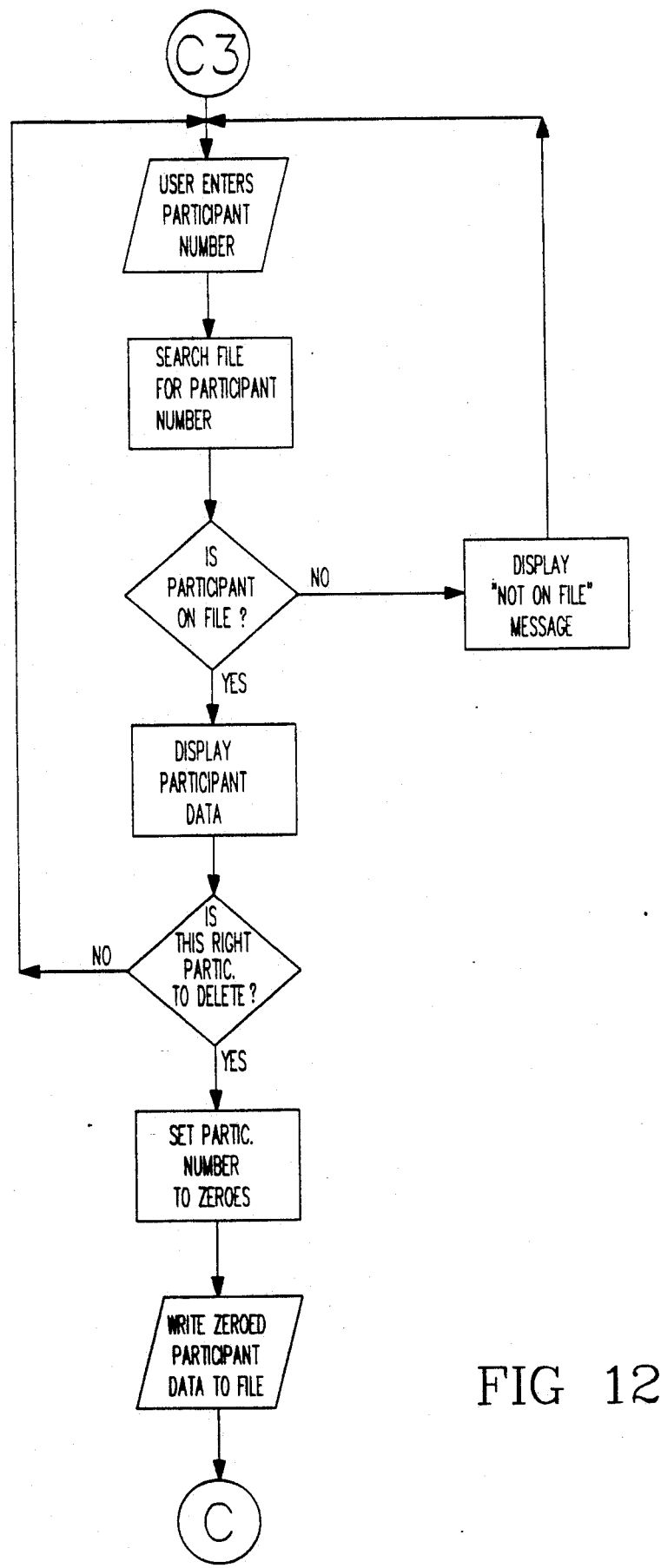
Figure 13:
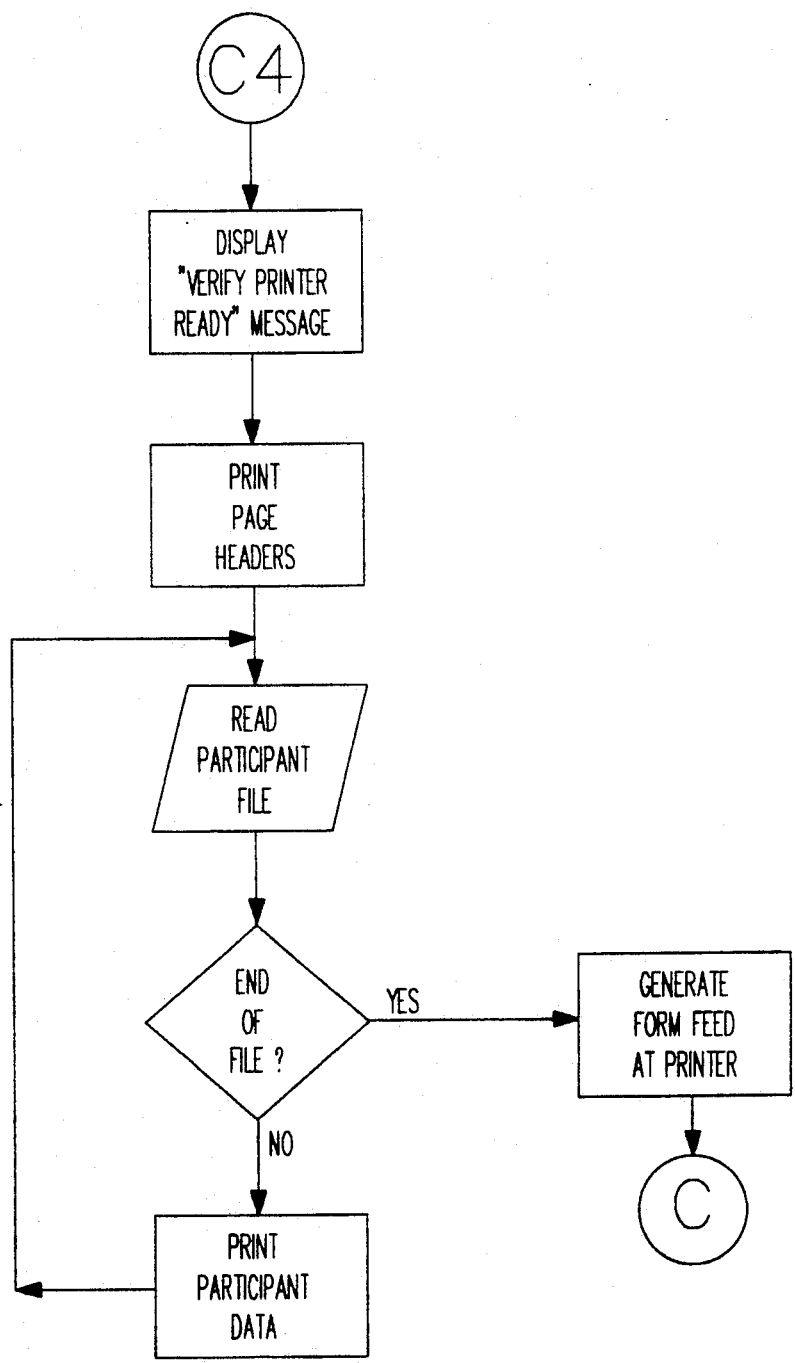

This function is entered by pressing "4" from the location shown in FIG. 9. A flow chart of it is shown in FIG. 13. It is designed to produce a hard copy report of the information pertaining to all the participants on file. A user will be asked to verify that the printer is turned on and on line. Once the printer is ready, the user presses any key and the report will be printed. Once the printing is complete, the program returns to location "C" shown in FIG. 9. At this point, entry of "5" will cause the program to return to location "G" shown in FIG. 2.

4. UPC Redemption Functions

From the Main Menu, an entry of "4" will cause the program to enter the UPC Redemption functions, shown in flow chart form in FIGS. 14-19. Once entry into the UPC Redemption branches is accomplished from the Main Menu, subsequent numerical entries will result in entering the Add UPC Redemption branch (if entry is "1"); the Update UPC Redemption branch (if entry is "2"); the Delete UPC Redemption branch (if entry is "3"); the Print UPC Redemption Report branch (if entry is "4"); or the Post UPC Redemptions to Participant File branch (if entry is "5"). Entry of a "6" will send the program back to location "G" in the Main Menu shown in FIG. 2.

a. Add UPC Redemption

Figure 15:
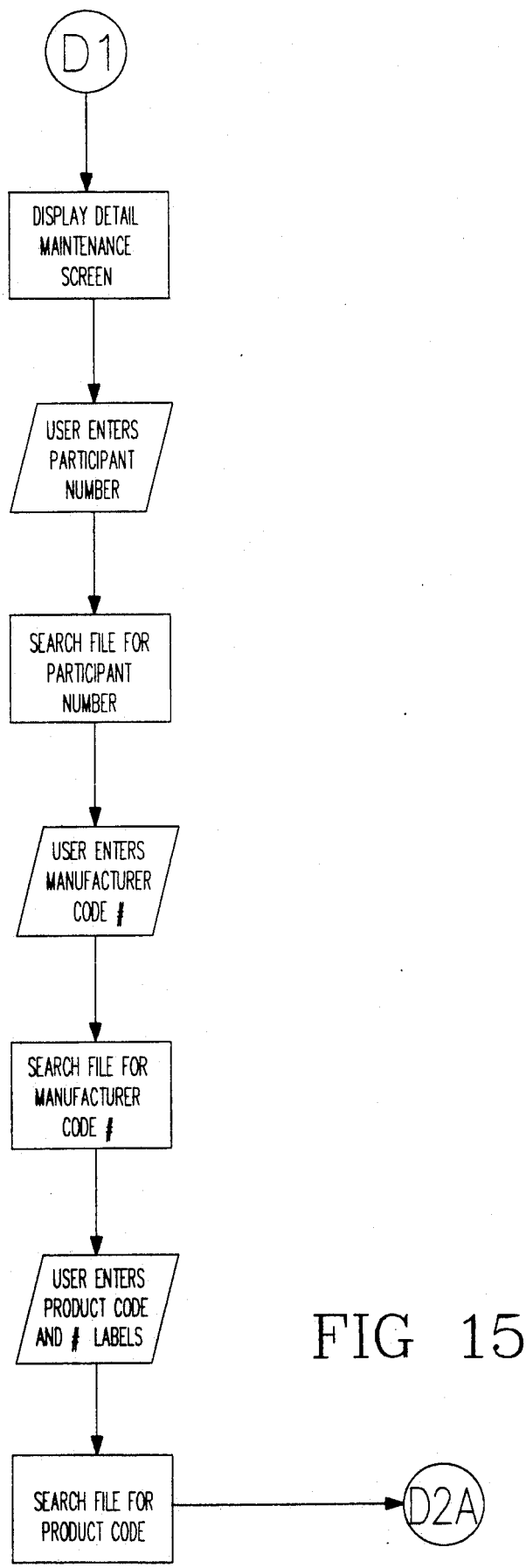

The Add UPC Redemption feature, shown in flow chart form in FIG. 15, will enable the user to record the redemption of UPC labels by the participants. Once this feature has been chosen, the user will be asked to enter the following information:

1. Participant's code number: enter the five digit identification code of the participant who is redeeming UPC labels.
2. Manufacturer's code number: enter the first five digits of the UPC label that the participant has redeemed. This is the manufacturer's code number, referred to above. The manufacturer's name will appear on the screen once the user has entered the manufacturer's code number.
3. Product code number: enter the second five digits of the UPC label that the participant has redeemed. This is the product code number, referred to above. The name of the product will appear on the screen once the user has entered the product code.
4. Number of UPC labels: enter the number of UPC labels that the participant has redeemed for this particular product, up to 999.

Once the user has entered all the required information, he will be given the opportunity to change any of the items that he has entered. The program shifts to location "D2A" shown in FIG. 16. For details concerning changes, see "Update UPC Redemption" below. If the user enters a zero, the UPC Redemption information will be written to the file, and the system returns to location "D" shown in FIG. 14.

After all entries and changes, if any, have been made, upon writing the information to the file the system will give this particular redemption transaction a "Key Number" (displayed near the top of the screen). This Key Number is a unique identifier for this particular transaction and is needed in order to make any changes or deletions (see below).

b. Update UPC Redemption

Figure 16:
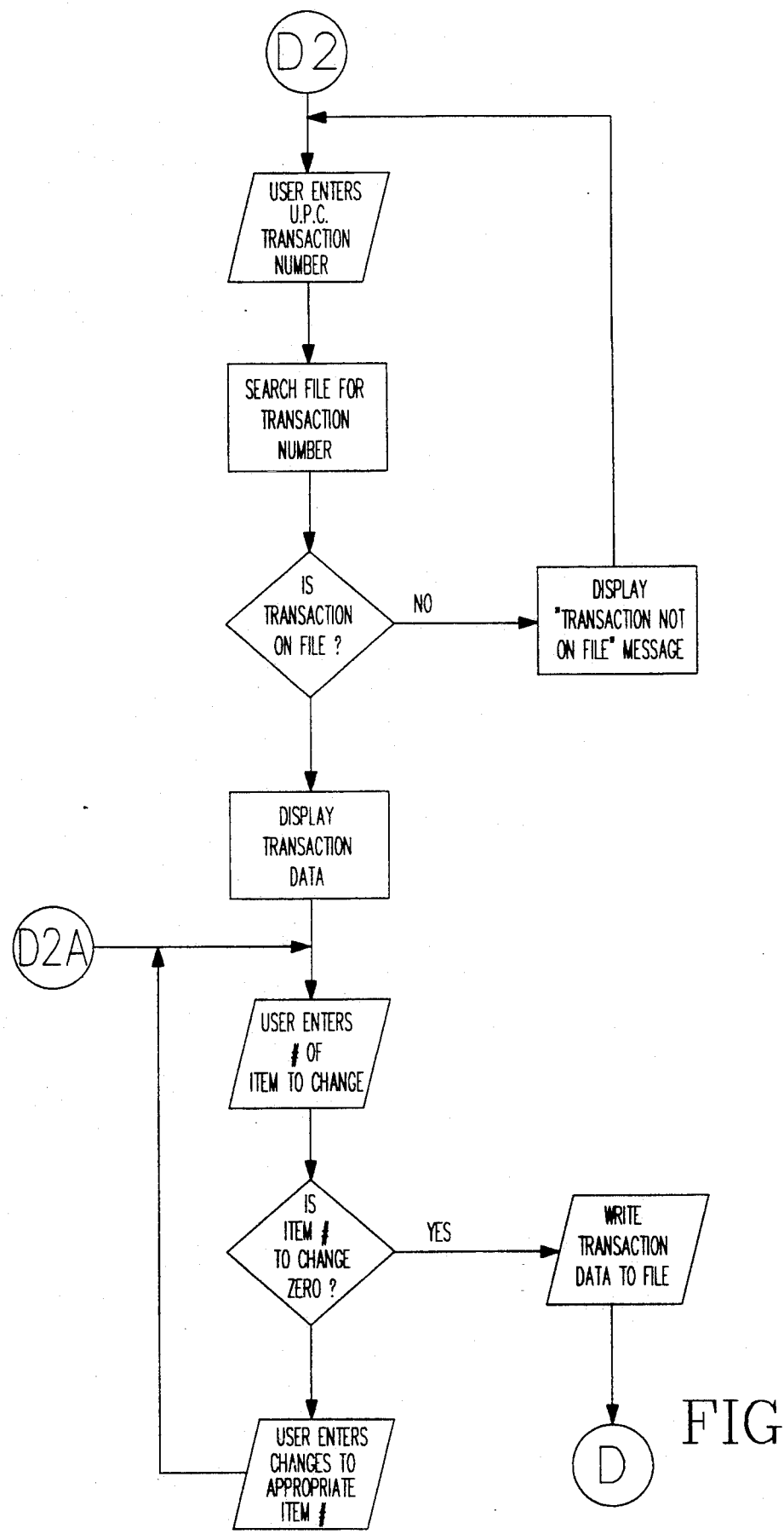

The Update UPC Redemption feature, shown in flow chart form in FIG. 16, will enable the user to make any changes to the redemption transactions entered previously. Once this feature has been selected, for example by entering a "2" from the configuration shown in FIG. 14, or arrived at automatically from the Add UPC Redemption section referenced above, the user will be asked to enter the Key Number of the particular transaction that he wishes to update. Once the user has entered the desired Key Number and that transaction is on file, the information pertaining to that transaction will be displayed. The user is then given the opportunity to change any of the items by entering the number of the desired item and pressing Enter. Refer to the Add UPC Redemption section, above, for items which can be changed. If the particular transaction is not on file, a message to that effect is displayed. Once all changes have been made, the user enters a zero and presses Enter, and the system returns to location "D" shown in FIG. 14.

c. Delete UPC Redemption

Figure 17:
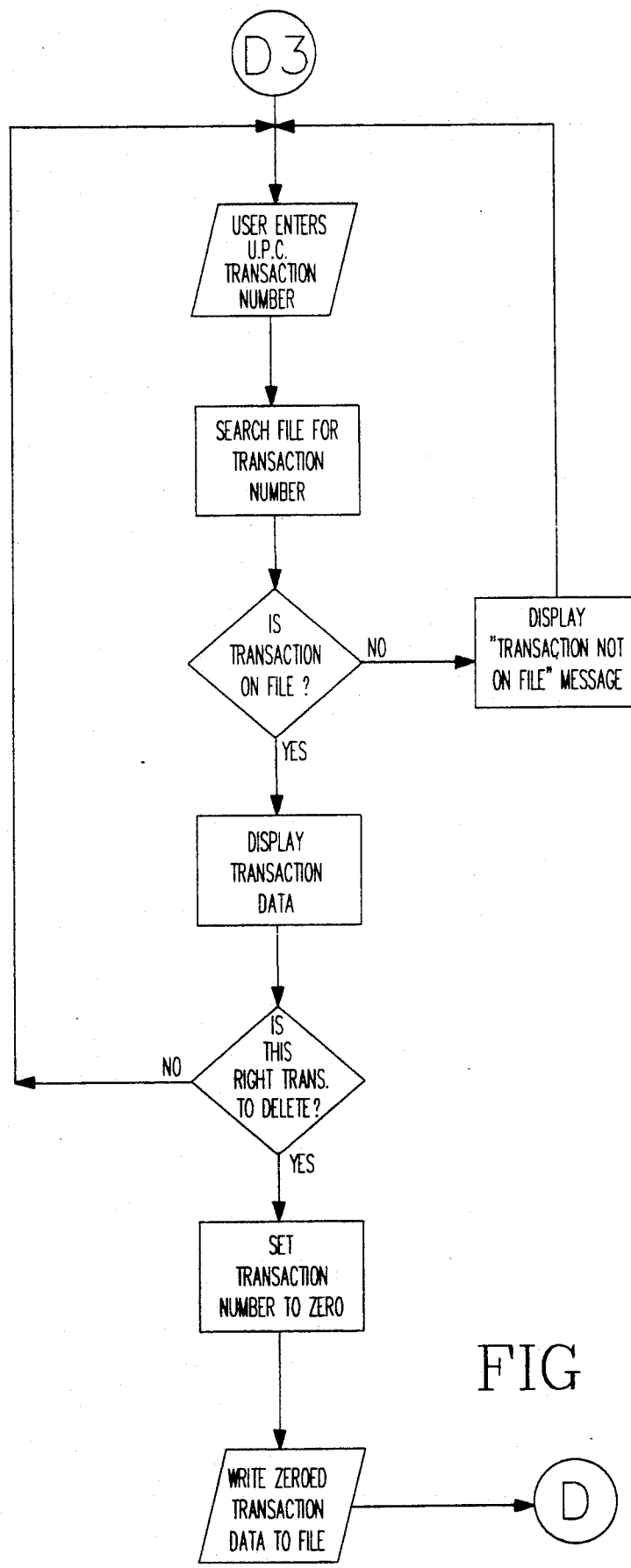

This function, shown in flow chart form in FIG. 17, is designed to allow the user to remove any redemption transaction from the data files. The function is entered by pressing "3" from the configuration shown in FIG. 14. Once the user has selected this function, he will be asked to enter the Key Number of the particular transaction that he wishes to delete. Once he has entered the desired Key Number, and that transaction is on file, the information pertaining to that transaction will be displayed on the screen. The user will then be asked if this is the correct transaction to delete. The user then enters "Y" or "N", for yes or no, as the case may be. If the user has entered yes, the transaction will be deleted. If the transaction is not on file, a message to that effect is displayed. If the transaction is on file but is not the one the user wishes to delete, he has an opportunity to enter the correct transaction number, if he knows it. Once the deletion(s) has been effected, the system returns to location "D" shown in FIG. 14.

d. Print UPC Redemption Report

Figure 14:
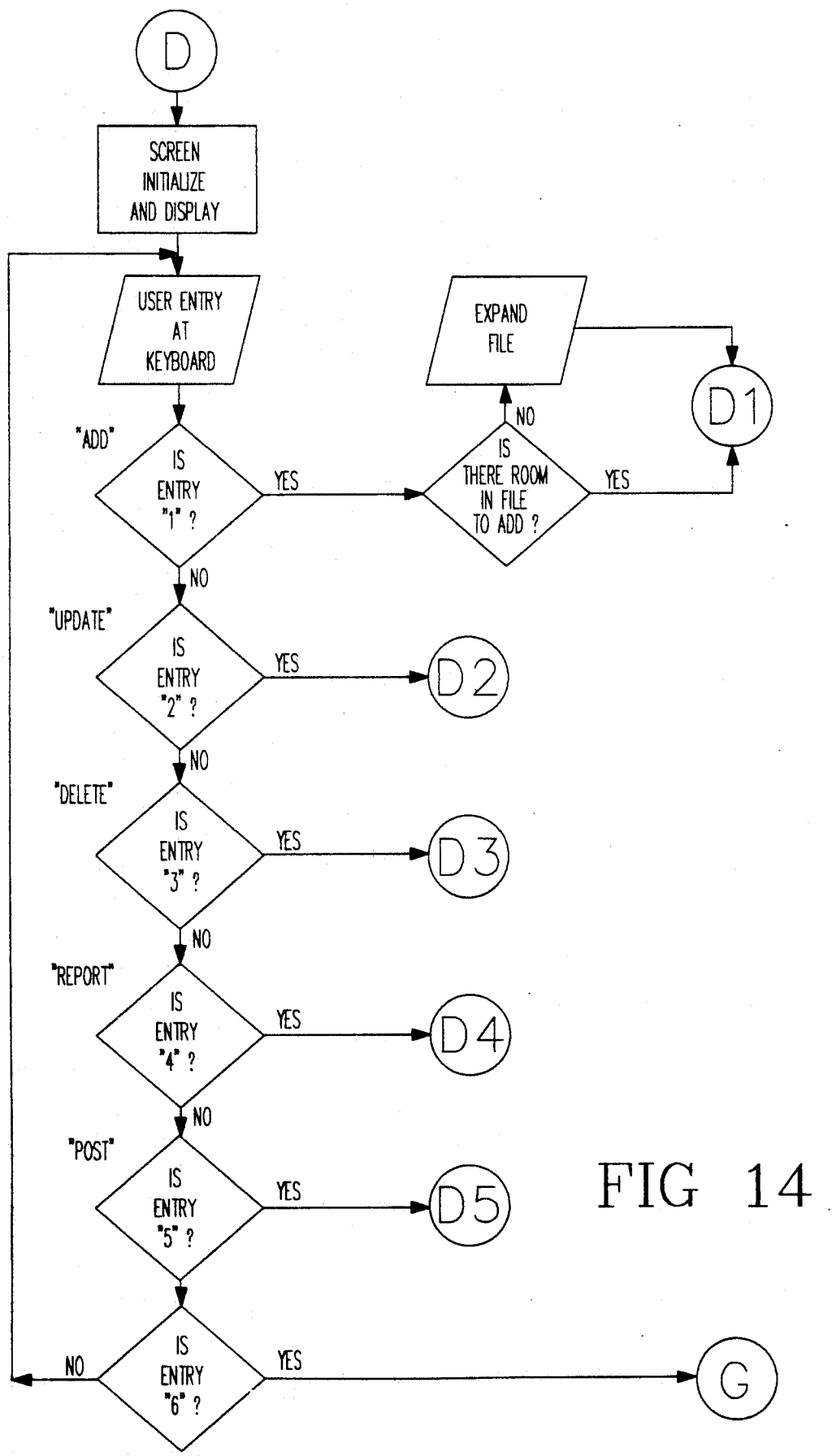
Figure 18:
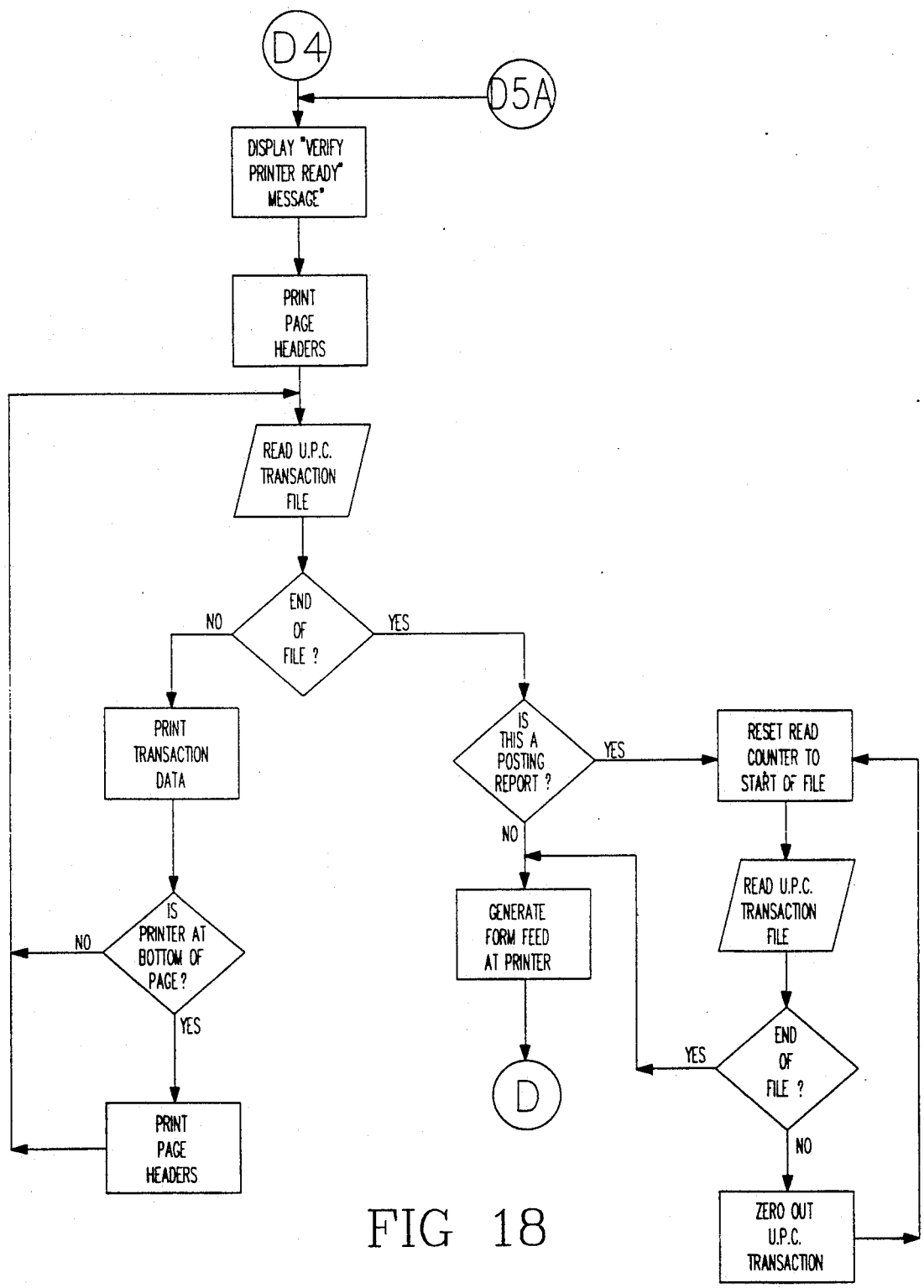

This function is entered by pressing "4" from the configuration shown in FIG. 14. A flow chart of it is shown in FIG. 18. A flow chart of it is shown in FIG. 18. It is designed to produce a hard copy report of the UPC redemptions that have been made by the participants. The user will be asked to verify that the printer is turned on and on line. Once the printer is ready, the user presses any key and the report will be printed. Once the printing is complete, the program returns to location "D" shown in FIG. 14.

e. Post UPC Redemptions to Participant File

This function will take the information that has been entered in the other UPC Redemption functions and will update the balances in the participants' files based upon the allowed credit for each product, as defined in the manufacturer file (see Manufacturer/Product Maintenance functions, above). This function is selected by entering "5" from the configuration shown in FIG. 14, and is shown in flow chart form in FIG. 19.

After the user has selected this function, he is given the opportunity to reconsider whether he wishes to post the UPC transactions. If the user is certain that he wishes to post the UPC redemptions to the participant file, he presses "Y" and then Enter. From that point, processing proceeds automatically, updating the participant file with the redemption information. Once the updating has been completed, a report is printed detailing the update. The user verifies that the printer is ready and on line, and presses any key to start the report printing.

Figure 19:
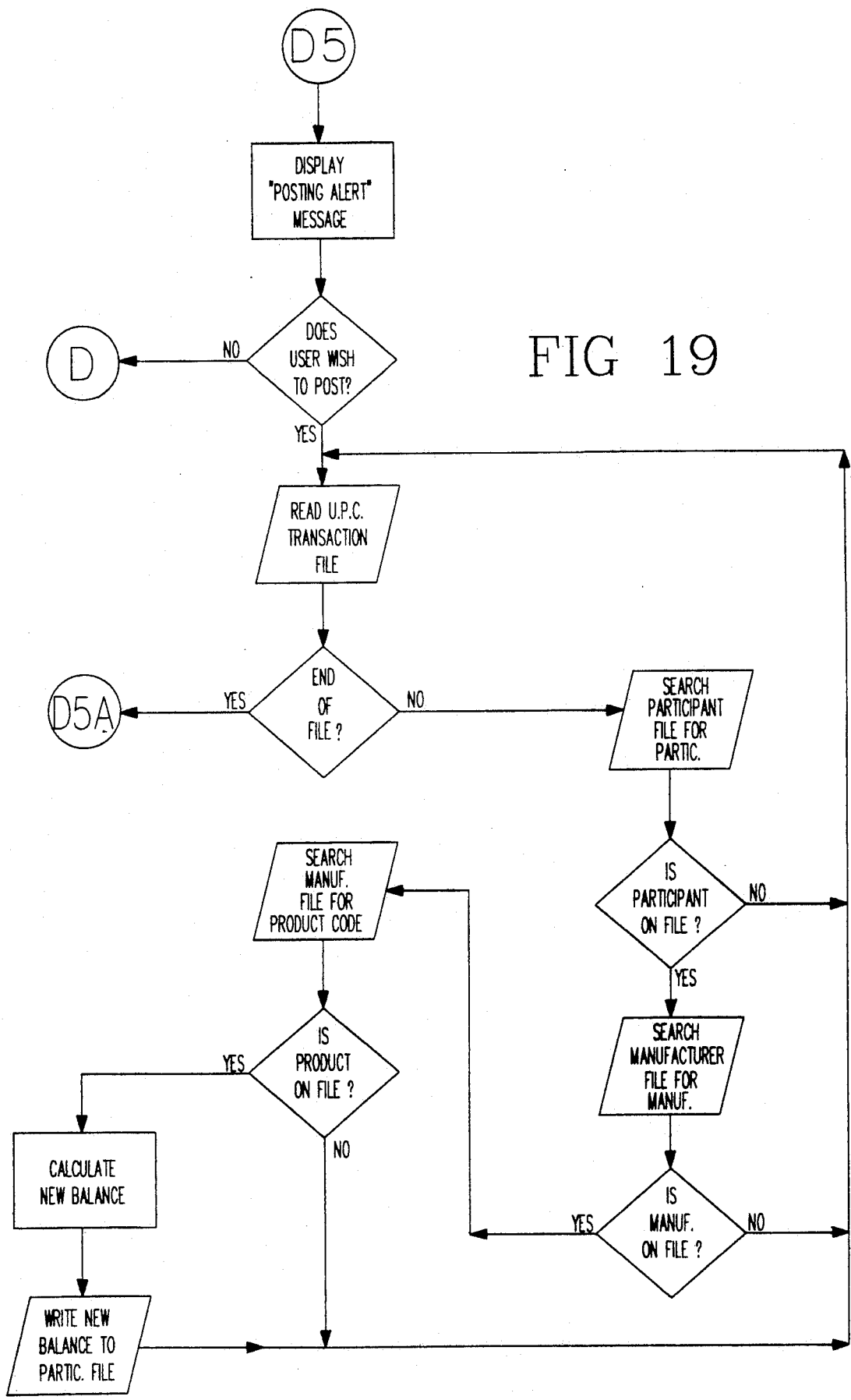
Figure 20:
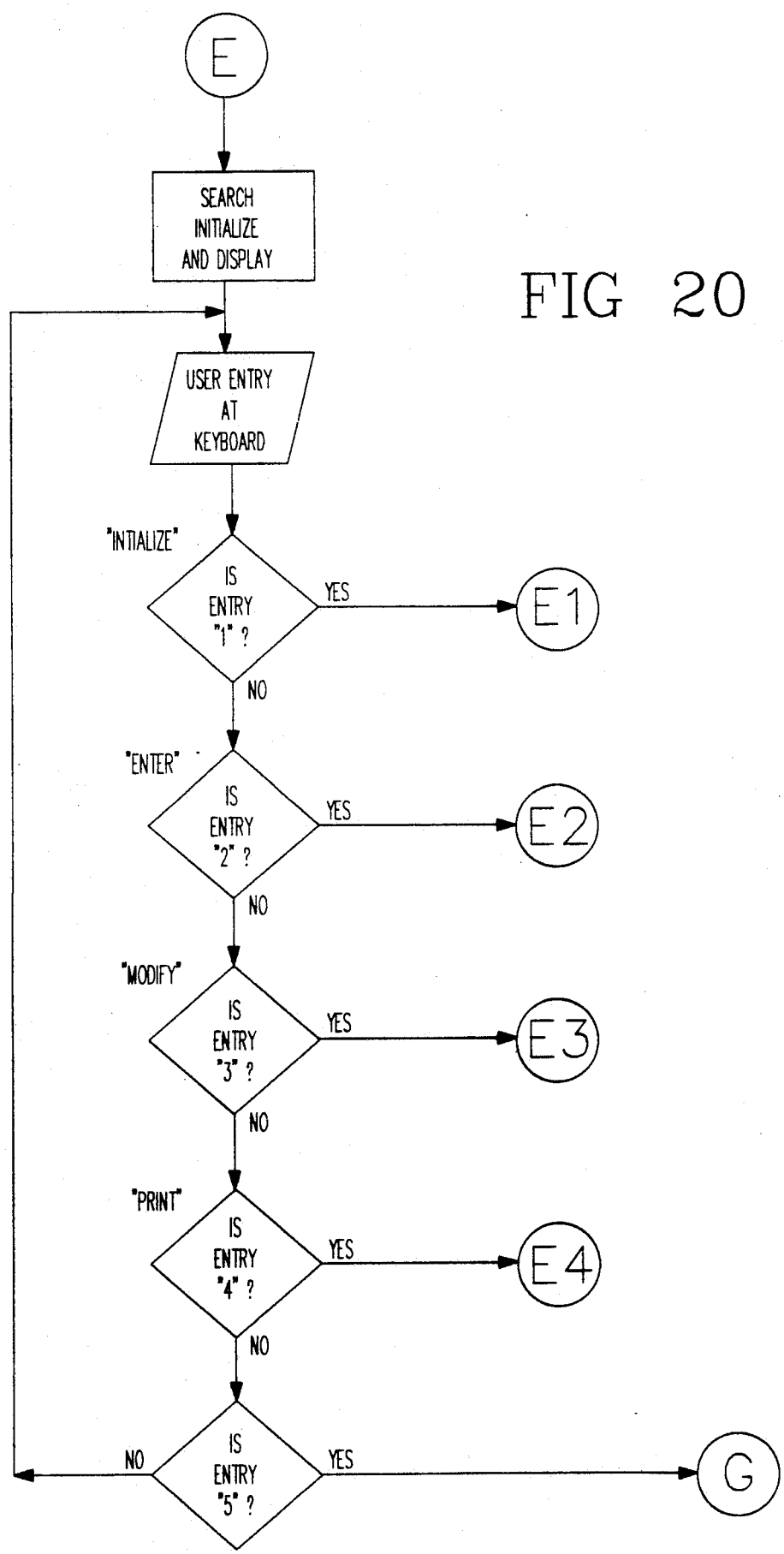

It is important to note that the redemption information is deleted once it has been posted to the participant file. This is done to avoid double postings. In the report function as shown in FIG. 18, when the complete UPC transaction file has been read, a determination is made as to whether the printed report is a posting report. If it is, a counter is set to the start of the UPC transaction file, and the file is sequentially zeroed out. FIG. 19 shows that when it is desired to post the UPC transactions, when the entire transaction file has been read, the system branches to location "D5A" shown at the top of FIG. 18. From there, printing of posted transactions and subsequent zeroing out proceeds. FIG. 19 also shows that when the UPC transaction file is read prior to reaching the end of the file, a search is made for the participant, manufacturer, and product information pertinent to the transaction. If all are present, the participant's new credit balance is calculated and the new balance is written to the participant file.

When all posting and printing has been completed, the program returns to location "D" shown in FIG. 14.

5. Stock Price Entry Functions

From the Main Menu, an entry of "5" will cause the program to enter the Stock Price Entry functions, shown in flow chart form in FIGS. 20-23. Once entry into the Stock Price Entry branches is accomplished from the Main Menu, subsequent numerical entries will result in entering the Initialize Stock Price file (if entry is "1"); the Enter All Stock Prices branch (if entry is "2"); the Modify Stock Prices branch (if entry is "3"); or the Print Stock Price Report branch (if entry is "4"). Entry of a "5" will send the program back to location "G" in the Main Menu shown in FIG. 2.

a. Initialize Stock Price File

Figure 21:
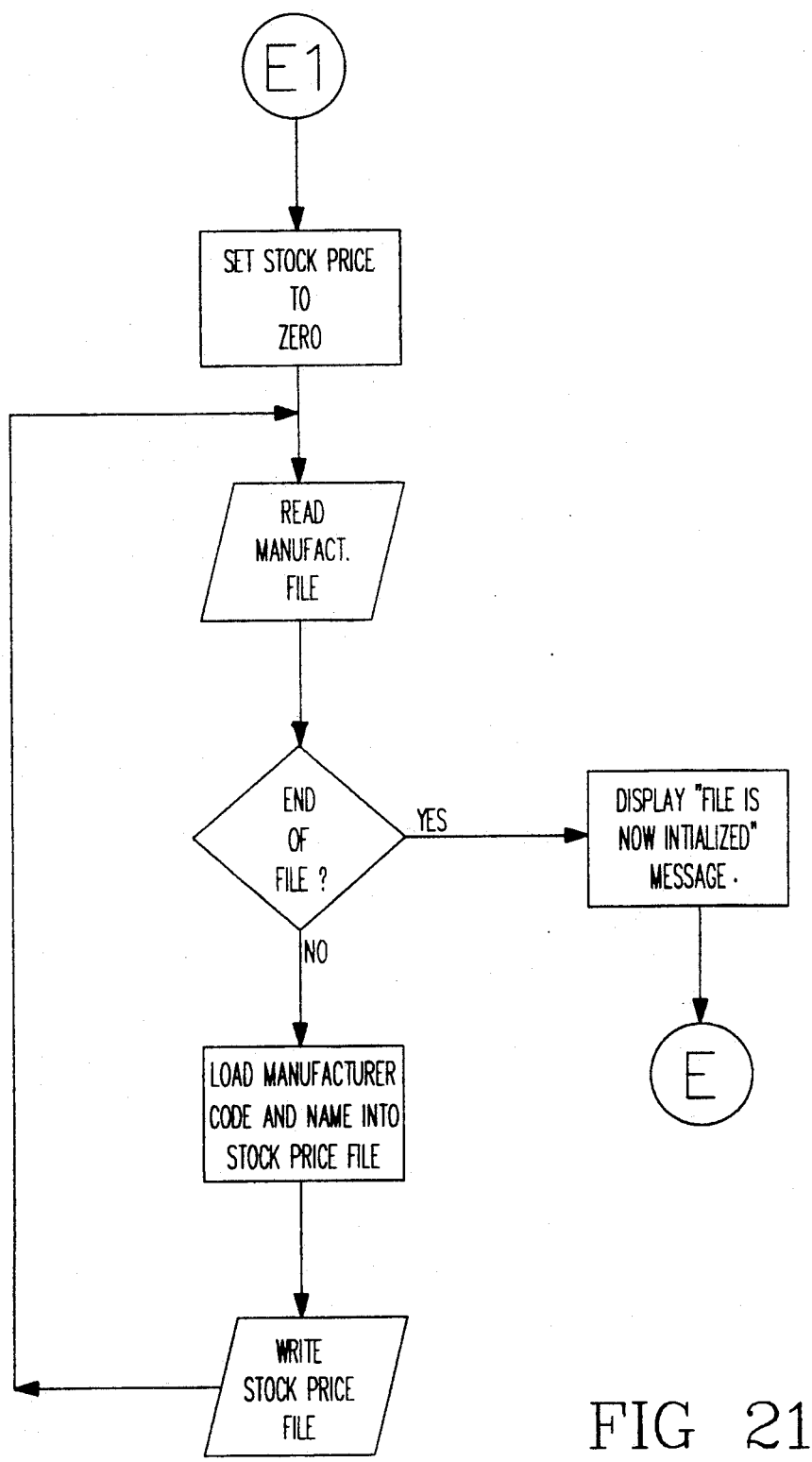

The Initialize Stock Price File feature, shown in flow chart form in FIG. 21, will set the stock prices to zero for all manufacturers that are currently on file. Once this feature has been chosen, processing proceeds automatically. When initialization is complete, the program returns to location "E" shown in FIG. 20.

b. Enter All Stock Prices

Figure 22:
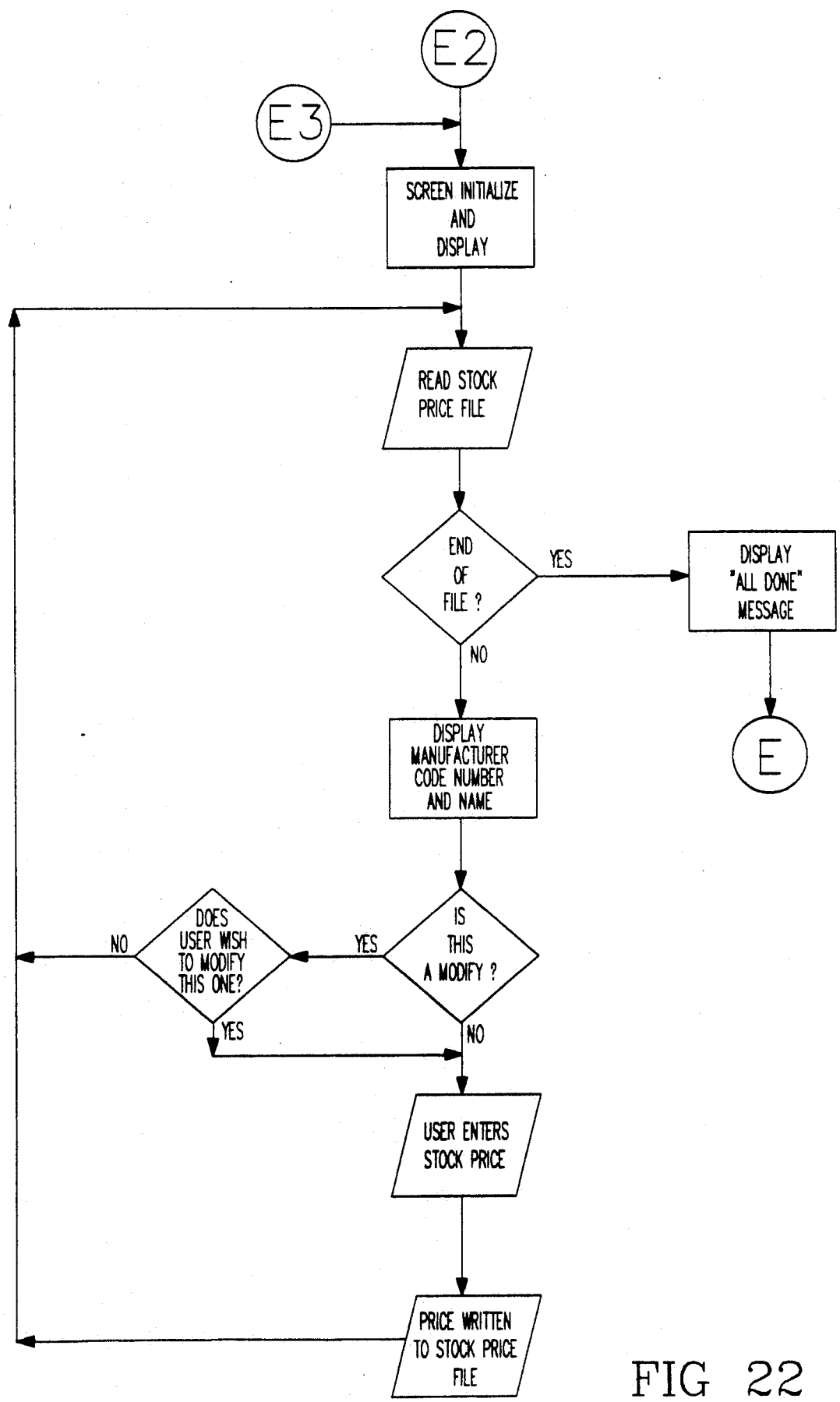

This function allows the user to enter current stock prices for all the manufacturers on file. The flow chart for this function, and the Modify Stock Price function, is shown in FIG. 22. Once the user has selected this function, the code number and name of the first manufacturer that is on file will appear on the screen. The user will be asked to enter the current stock price, preferably in dollars and cents with no decimal point, down to 1/10 of a cent. For example, if the current stock price is 17⅞, the user types 17875 and presses Enter. The system will re-display the price as 17.875. If the stock price is 34½, the user types 34500 and presses Enter. When the user has entered the appropriate stock price(s), the next manufacturer code and name will appear and the user will be asked to enter the current stock price(s) for that manufacturer. This cycle will continue until stock prices have been entered for all manufacturers on file. The system then returns to location "E" shown in FIG. 20.

c. Modify Stock Prices

The Modify Stock Prices feature is shown in flow chart form in FIG. 22, and will allow the user to change one, some, or all of the stock prices for the manufacturers on file. Once this feature has been selected, the code, name, and current stock price for the first manufacturer will appear. The user is asked if he wishes to modify the stock price, and enters "Y" or "N" for yes or no as appropriate. If "Y" is entered, the user will be given the opportunity to re-enter the stock price, as in the Enter All Stock Prices feature referred to above. The modify cycle will continue until all the stock prices for all of the manufacturers on file have been scanned. When completed, the system will return to location "E" shown in FIG. 20.

d. Print Stock Price Report

Figure 23:
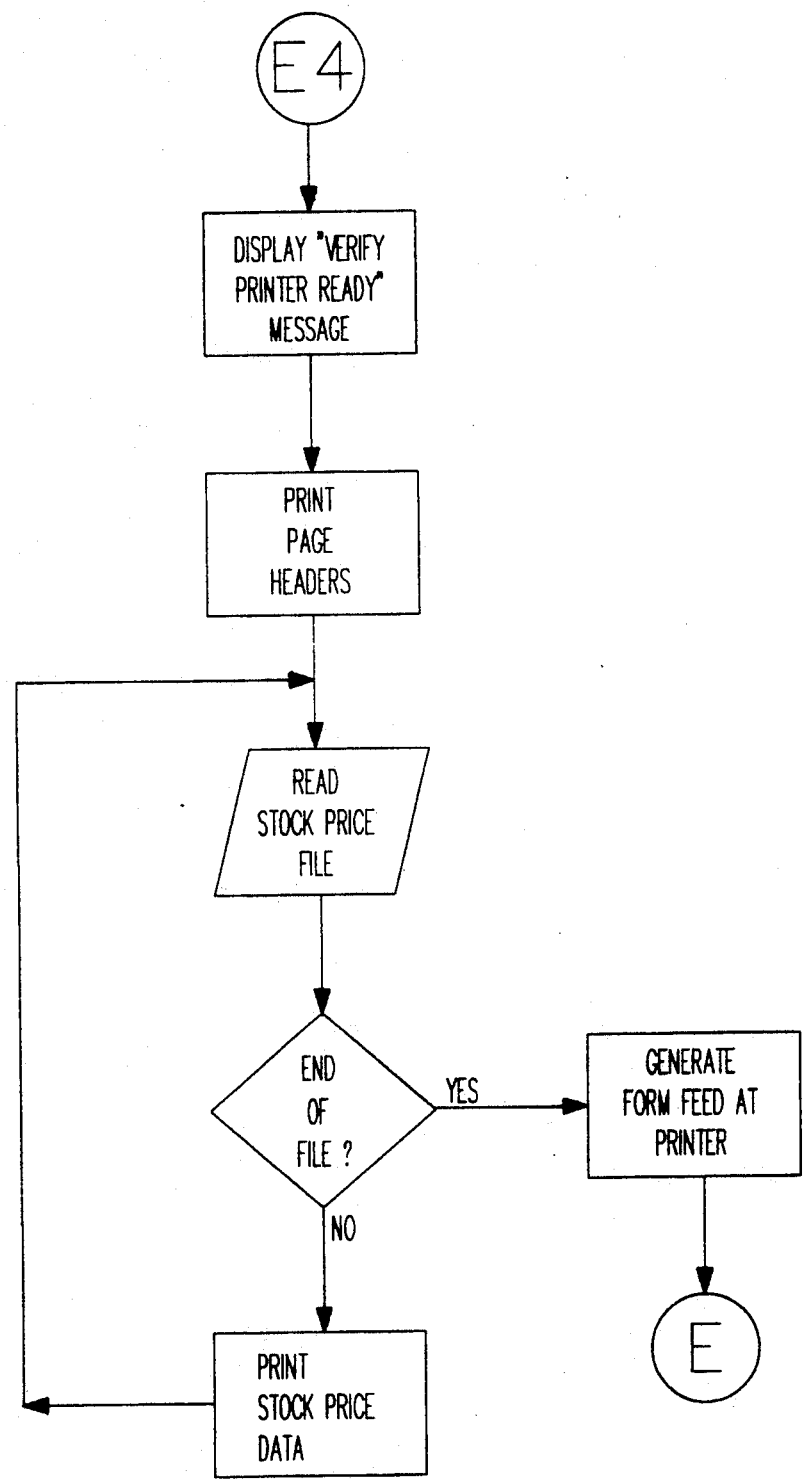

This function, shown in flow chart form in FIG. 23, is designed to produce a hard-copy report of the current stock prices for all of the manufacturers on file. As in the case of the other reports referred to above, the user will be asked to verify that the printer is ready. Once the printer is ready, the user presses any key and the report will be printed. Once the printing is completed, the program returns to location "E" shown in FIG. 20.

6. Stock Purchase Functions

Figure 24:
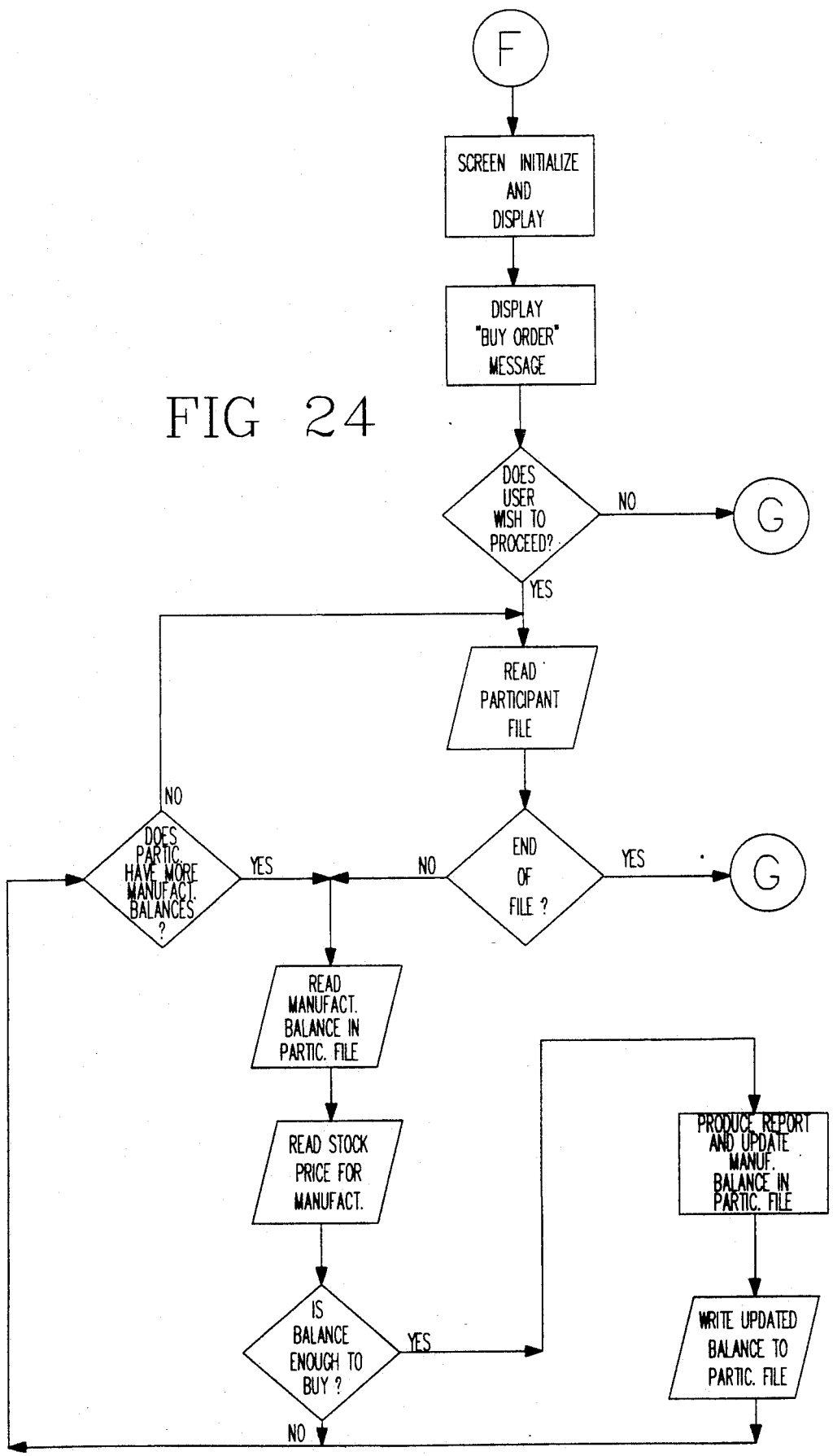

From the Main Menu, an entry of "6" will cause the program to enter the Stock Purchase functions, shown in flow chart form in FIG. 24. This function essentially comprises the final step of the system and method of the present invention. It will correlate the participant information and the current stock price information and will produce Buy Orders for those participants who have accumulated enough credit to purchase one or more shares of stock.

Once the user has selected this function, he will be asked to verify that this is, in fact, the desired operation. If the user responds affirmatively, he will then be asked to verify that the printer is on line and ready. If it is, then processing will proceed automatically, correlating accumulated credits, printing Buy Orders and updating participant credit balances as the Buy Orders are produced. During processing, the program reads the participant file, reads the particular manufacturer credit balances in the participant file and reads the current stock price for the particular manufacturers. A comparison is made, and if the credit balance(s) equals or exceeds the stock price(s), a Buy Order is issued for the appropriate number of shares of stock. The participant's manufacturer balance(s) is reduced according to the amount of credits used in the Buy Order and the updated balances are written to the participant file. When all manufacturer credit balances have been read for a participant, and all Buy Orders issued for that participant, reading of the participant file continues as above, issuing any appropriate Buy Orders and updating credit balances for all participants. When the end of the file is reached, the program returns to location "G" of FIG. 2.

7. FIGS. 25–32

Figure 25:
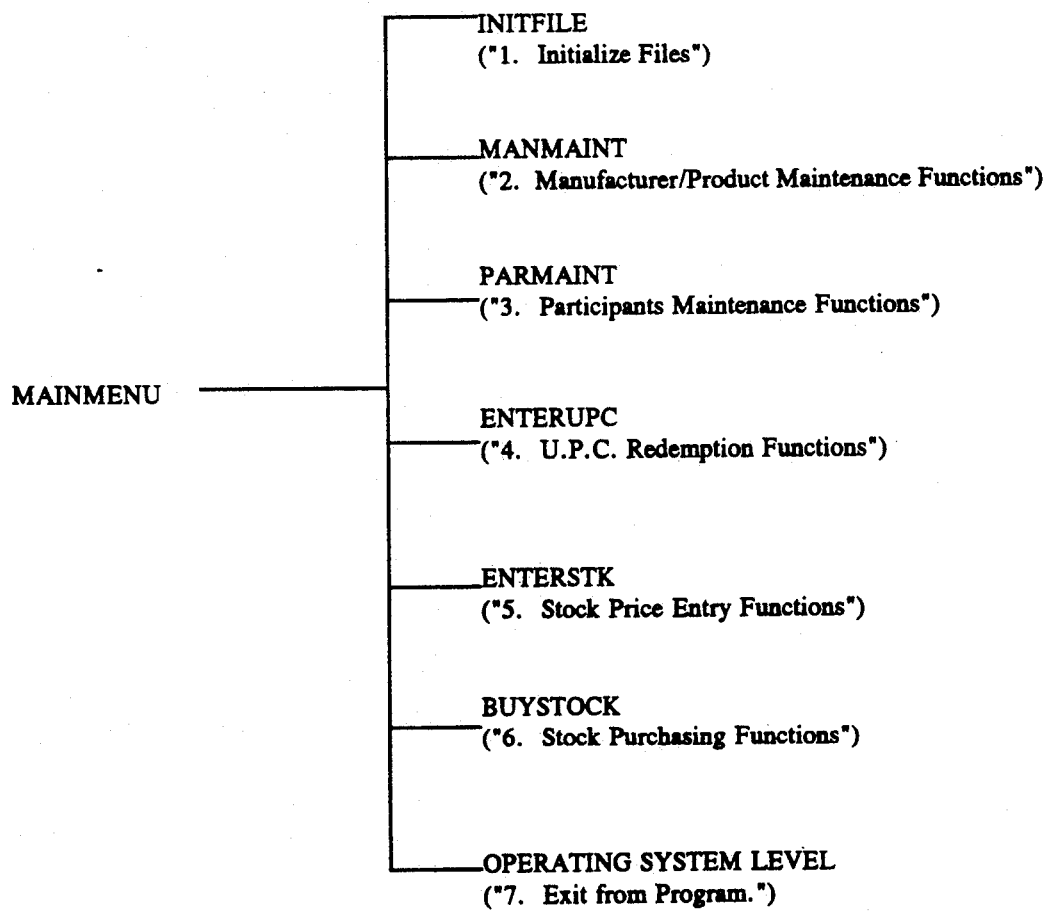
FIG. 25 is an illustration of the relationships of the programs comprising the system of the present invention.

FIG. 25 illustrates the relationship of the various programs comprising the computer system of the present invention. As shown, all program functions are tied to the Main Menu program, including INITFILE (Initialize Files), MANMAINT (Manufacturer/Product Maintenance), PARMAINT (Participants Maintenance), ENTERUPC (UPC Redemption), ENTERSTK (Stock Price Entry), and BUYSTOCK (Stock Purchasing).

FIG. 26 shows the field names, lengths, and descriptions for the data files comprised in the system, including the Manufacturer/Product File, the Participant File, the UPC Redemption File, and the Stock Price File. In the Manufacturer/Product File of the working prototype of the invention described and claimed herein, for each manufacturer, data is kept for up to four products, including the products' UPC codes, names, and credit amounts upon redemption. The Participant File has, for each participant, credit balance information for up to five manufacturers. The UPC Redemption File includes fields for the participant's identification number, manufacturer's UPC code from redeemed labels, the product codes for those labels, and the number of labels redeemed. The Stock Price File includes fields for the manufacturer's UPC code number, the manufacturer's name, and the price per share of stock.

FIG. 27 shows a sample Manufacturer/Product Report. As can be seen from FIG. 27, the manufacturer Kingston has four products, with credits ranging from $0.070 to $0.250. Smith's has only two products, with credit amounts of $0.250 and $0.170. Kellogg's has three products, each with its own credit amount of $0.125, $0.140 and $0.130.

FIG. 28 shows a sample Participant Report. Four participants are identified, and their respective manufacturer balances are indicated. Note, for example, that Mr. John Q. Public has an accrued balance of $27.00 for the manufacturer Kingston; Mr. Sulu has $20.625 for Smith's and Ms. Johnson has $11.125 for Smith's. Ms. Johnson has returned UPC labels for only Smith's, and the other three participants have each returned labels for Kingston, Kellogg's, and Smith's.

FIG. 29 shows a sample UPC Redemption Report. Mr. Shrub has redeemed 5 Kellogg's labels at 0.140 for a total credit of $0.700, and 2 Kingston labels at 0.100 for a total credit of $0.200. Mr. Sulu has redeemed 12 Smith's labels at 0.170 each for a total credit of $2.040.

FIG. 30 shows a sample Stock Price Report, listing manufacturer code and name for each manufacturer, and that manufacturer's current stock price. Note that Kingston stock is priced at $13.125, and that according to FIG. 28, Mr. John Q. Public has an accrued credit balance of $27.000, enough for two shares of Kingston stock (which would cost $26.250). Note also that Mr. Public has enough accumulated credit for Smith's ($20.500, per FIG. 28) to purchase precisely one share of Smith's stock, listed at $20.500 in FIG. 30. Further, from FIG. 28, note that Mr. Sulu has enough credit for Smith's ($20.625) to purchase one share of Smith's stock, again priced at $20.500 per FIG. 30. No other participant has enough credit to buy any other stocks; compare FIG. 28 with FIG. 30.

FIG. 31 is a sample Buy Stock Order for Mr. Public, showing the order for two shares of Kingston stock and one share of Smith's stock, as discussed above. FIG. 32 is another sample Buy Stock Order, this one being for Mr. Sulu, showing the order for one share of Smith's stock.

8. Miscellaneous

As indicated previously, when the present invention is fully implemented, data entry will be simplified and expedited in that substantially all of the data entry functions will be automated. The stock prices preferably will be supplied through an on-line stock quotation service. Participants will preferably submit machine-readable identification means, such as punch cards, along with their UPC labels. Stock purchases will preferably be made from Buy Orders dispatched electronically from the processing center to the brokers' offices. UPC labels will preferably be authenticated and scanned with a light pen, laser scanner, or the like. Equipment and systems for the foregoing automated functions are well known in the automated data acquisition, entry, handling, and processing arts. As such, these well-known systems need not be described further herein. By way of example, however, and not by way of limitation, apparatus which could be used in the UPC scanning operations described herein includes the BDI Scanner, the SPF Scanner, the HandiScan hand-held scanner, the MS-260 Compact Scanner (a mountable slot scanner), and the Datachecker systems manufactured by National Semiconductor Datachecker/DTS, a subsidiary of National Semiconductor Corporation, of Houston, Tex.

Also as mentioned previously, the working prototype of the system and method of the present invention is self-contained, held entirely on a single diskette. Rather than submitting a diskette, a copy of the code comprising the computer programs of the present invention is attached as Appendix "I".

While a preferred embodiment of the present invention has been described herein, modifications may be made by those skilled in the art without departing from the spirit of the invention. Therefore, the scope of the present invention should be ascertained by reference to the following claims.

What is claimed is:

1. A method of determining entitlement to ownership of stocks in a company, comprising the steps of:
   (a) maintaining in an on-line storage facility of a digital computer
      (i) a manufacturer/product file for predetermined manufacturers or suppliers of selected goods or services, said manufacturer/product file including an identifying code for each of said predetermined manufacturers or suppliers, and product information on those of said selected goods or services provided by each of said predetermined manufacturers or suppliers, said product information including an identifying code for each of said selected goods or services and a credit amount to be awarded upon redemption of a UPC label showing purchase of a unit of said selected goods or services;
      (ii) a participant file for participating consumers of said selected goods or services of said predetermined manufacturers or suppliers, said participant file including an identifying code for each of said participating consumers, and a manufacturer or supplier sub-file for each of said participating consumers, said manufacturer or supplier sub-file including the identifying code for each manufacturer or supplier for whom the respective participating consumers have redeemed UPC labels showing purchase of a unit of said selected goods or services and the accumulated credit balance of the respective participating consumers for each such manufacturer or supplier;
      (iii) a UPC redemption file for processing UPC labels of said selected goods or services redeemed by said participating consumers, said UPC redemption file including repositories for the identifying codes of the participating consumers who redeem UPC labels, the manufacturer or supplier and the chosen ones of said selected products for which UPC labels are redeemed, and the number of UPC labels redeemed;
      (iv) a stock price file for keeping current prices for stock of the predetermined manufacturers or suppliers;
   (b) scanning UPC labels redeemed by participating consumers for content;
   (c) verifying the scanned content through comparison with the contents of the manufacturer/product file that the redeemed UPC labels are for said selected goods or services of said predetermined manufacturers or suppliers and if so, entering the number of such UPC labels redeemed;
   (d) storing the results of step (c) in the UPC redemption file under the appropriate participating consumer;
   (e) posting UPC redemption transactions stored in the UPC redemption file pursuant to step (d) from the UPC redemption file to the appropriate participating consumer in the participant file and zeroing out the posted transactions from the UPC redemption file to avoid double posting, said posting including updating the manufacturer or supplier credit balances for said participating consumers in an amount commensurate with the verified UPC labels redeemed by the respective participating consumers;
   (f) comparing the manufacturer or supplier credit balances of participating consumers with the current stock prices for the respective ones of said manufacturers or suppliers;
   (g) issuing buy orders for an appropriate number of shares of stock in a particular manufacturer or supplier for each participating consumer whose accumulated credit balance for that particular manufacturer or supplier equals or exceeds the manufacturer's or supplier's current stock price; and
   (h) reducing the manufacturer or supplier credit balances for each participating consumer for whom a buy order is issued in an amount reflective of the amount of credit required to cover the buy order.

2. The method of claim 1, wherein step (b) includes scanning the UPC labels with a light pen.

3. The method of claim 1, wherein step (b) includes scanning the UPC labels with a laser scanner.

4. The method of claim 1, and further including between step (a) and step (b) the additional step of:
   (a1) authenticating the UPC labels redeemed by participating consumers.

5. The method of claim 1, wherein the step (g) includes the further step of transmitting the buy orders electronically, via modem, to the recipients upon issuance.

6. The method of claim 1, wherein the identifying code for said predetermined manufacturers or suppliers comprises the first five digits of the standard 10-digit UPC code.

7. The method of claim 6, wherein the identifying code for said selected goods or services comprises the last five digits of the standard 10-digit UPC code.

* * * * *